United States Patent [19]

DiBiase et al.

[11] Patent Number: 4,612,129

[45] Date of Patent: Sep. 16, 1986

[54] SULFUR-CONTAINING COMPOSITIONS, AND ADDITIVE CONCENTRATES AND LUBRICATING OILS CONTAINING SAME

[75] Inventors: Stephen A. DiBiase; Kirk E. Davis, both of Euclid; Thomas A. Tagliamonte, Mentor, all of Ohio

[73] Assignee: The Lubrizol Corporation, Wickliffe, Ohio

[21] Appl. No.: 696,839

[22] Filed: Jan. 31, 1985

[51] Int. Cl.$^4$ ............... C10M 135/18; C10M 133/58
[52] U.S. Cl. .................................. 252/33.6; 252/45; 252/47.5
[58] Field of Search ..................... 252/33.6, 45, 47.5

[56] References Cited

U.S. PATENT DOCUMENTS

| | | | |
|---|---|---|---|
| Re. 27,331 | 4/1972 | Coleman | 252/45 |
| 2,265,851 | 12/1941 | Matheson | 252/48 |
| 2,394,536 | 2/1946 | Denison, Jr. et al. | 252/33.6 |
| 2,703,784 | 3/1955 | Fields | 252/32.7 |
| 2,805,996 | 9/1957 | Deger | 252/33.6 |
| 2,850,453 | 9/1958 | Fields | 252/32.7 |
| 2,947,695 | 8/1960 | Leshin et al. | 252/33.6 |
| 2,999,813 | 9/1961 | Givens et al. | 252/33.6 |
| 3,221,056 | 11/1965 | Louthan | 260/583 |
| 3,419,614 | 12/1968 | Doss | 260/583 |
| 3,498,915 | 3/1970 | Coleman | 252/47.5 |
| 3,509,051 | 4/1970 | Farmer et al. | |
| 3,632,566 | 1/1972 | Coleman | 252/45 |
| 3,663,561 | 5/1972 | Blaha | 252/47 |
| 4,098,705 | 7/1978 | Sakurai et al. | 252/33.6 |
| 4,119,549 | 10/1978 | Davis | 252/47 |
| 4,119,550 | 10/1978 | Davis et al. | 252/47 |
| 4,140,643 | 2/1979 | Davis | 252/47.5 |
| 4,191,659 | 3/1980 | David | 252/45 |
| 4,360,438 | 11/1982 | Rowan et al. | 252/33.6 |
| 4,479,883 | 10/1984 | Shaub et al. | 252/33.6 |
| 4,487,706 | 12/1984 | Lam | 252/47 |

Primary Examiner—Jacqueline V. Howard
Attorney, Agent, or Firm—Karl Bozicevic; Walter C. Danison, Jr.; Denis A. Polyn

[57] ABSTRACT

Sulfur-containing, oil-soluble compositions are described which are useful as lubricating oil additives, particularly in lubricants containing little or no phosphorus. In one embodiment, the compositions of the invention comprise (A) at least one metal salt of at least one dithiocarbamic acid of the formula $$R_1(R_2)N\text{---}CSSH \quad (I)$$

wherein $R_1$ and $R_2$ are each independently hydrocarbyl groups in which the total number of carbon atoms in $R_1$ and $R_2$ is sufficient to render the metal salt oil-soluble, (B) at least one oil-soluble sulfurized organic compound, and (C) at least one auxiliary corrosion-inhibitor. In other embodiments, the compositions also contain (D) at least one detergent/dispersant. Lubricating oil compositions containing the compositions of the invention exhibit improved oxidation-corrosion-inhibiting properties, anti-wear properties, and/or extreme pressure properties. Such lubricating compositions containing less than about 0.1% by weight of phosphorus also exhibit good compatability with nitrile seals.

40 Claims, No Drawings

SULFUR-CONTAINING COMPOSITIONS, AND ADDITIVE CONCENTRATES AND LUBRICATING OILS CONTAINING SAME

TECHNICAL FIELD OF THE INVENTION

This invention relates to sulfur-containing compositions which are oil-soluble and which are useful as lubricating oil additives particularly in lubricants containing little or no phosphorus. More particularly, the present invention relates to lubricants containing little or no phosphorus and a composition comprising at least one metal dithiocarbamate, at least one sulfurized organic compound and at least one auxiliary corrosion-inhibitor.

BACKGROUND OF THE INVENTION

Various compositions prepared by the sulfurization of organic compounds and more particularly olefins and olefin-containing compounds are known in the art, as are lubricants containing these products. Typical sulfurized compositions prepared by reacting olefins such as isobutene, diisobutene, and triisobutene with sulfur under various conditions are described in, for example, *Chemical Reviews*, 65, 237 (1965). Other references describe the reaction of such olefins with hydrogen sulfide and elemental sulfur to form predominantly mercaptans with sulfides, disulfides and higher polysulfides also being formed as by-products. Reference is made to *J. Am. Chem. Soc.*, 60, 2452 (1938), and U.S. Pat. Nos. 3,221,056, 3,419,614 and 4,191,659. U.S. Pat. Nos. 3,419,614 describes a process for increasing the yield of mercaptan by carrying out the reaction of olefin with hydrogen sulfide and sulfur at a high temperature in the presence of various basic materials. U.S. Pat. No. 4,191,659 describes the preparation of sulfurized compositions by reaction at superatmospheric pressure of olefins with a mixture of sulfur and hydrogen sulfide in the presence of a catalyst followed by treatment with an alkali metal sulfide. The use of sulfurized natural and synthetic oils as additives in lubricating compositions has been suggested in the art such as in, for example, U.S. Pat. Nos. 2,999,813 and 4,360,438.

It also has been known that Diels-Alder adducts can be sulfurized to form sulfur-containing compositions which are particularly useful as extreme pressure and anti-wear additives in various lubricating oils. U.S. Pat. Nos. 3,632,566 and Reissue 27,331 describe such sulfurized Diels-Alder adducts and lubricants containing said adducts. In these patents, the ratio of sulfur to Diels-Alder adduct is described as being a molar ratio of from about 0.5:1.0 to 10.0:1.0. The patents indicate that it is normally desirable to incorporate as much stable sulfur into the compound as possible, and therefore, a molar excess of sulfur normally is employed. The disclosed lubricating compositions may contain other additives normally used to improve the properties of lubricating compositions such as dispersants, detergents, extreme pressure agents, and additional oxidation and corrosion-inhibiting agents, etc. For some lubricant applications, however, the above-described sulfur-containing compositions have not been entirely adequate as multi-purpose additives.

Organophosphorus and metal organophosphorus compounds are used extensively in lubricating oils as extreme pressure agents and anti-wear agents. Examples of such compounds include: phosphosulfurized hydrocarbons such as the reaction product of a phosphorus sulfide with turpentine; phosphorus esters including dihydrocarbon and trihydrocarbon phosphites; and metal phosphorodithioates such as zinc dialkylphosphorodithioates. Because of the toxicological problems associated with the use of organophosphorus compounds, and particularly with the metal dialkylphosphorodithioates, there is a need to develop lubricant compositions containing low levels of phosphorus yet characterized as having acceptable oxidation inhibition and anti-wear properties. Lubricants containing low levels of phosphorus also are desirable in view of the tendency of phosphorus to poison catalytic converters used to control emissions from gasoline engines.

Polyvalent metal salts of dithiocarbamic acids are known and have been described as being useful oil additives because they serve the dual function of sequestering undesirable metal components of the oil and because they function as anti-oxidants. Lubricating oil compositions have been described comprising combinations of various polyvalent metal dithiocarbamates with other chemical additives exhibiting desirable property-improving characteristics when added to the lubricating oil in combination with the dithiocarbamates. For example, U.S. Pat. No. 2,999,813 describes a lubricating composition comprising a sulfurized mineral oil and a polyvalent metal dithiocarbamate. Preferably, the composition also includes a lead soap of a naphthenic fatty acid. The preparation of lubricating compositions comprising mineral oil, metal salts of dithiocarbamic acids and coupling agents such as alcohols, esters, ketones and other stable oxygen-containing materials is described in U.S. Pat. No. 2,265,851. U.S. Pat. No. 2,394,536 describes lubricating oil compositions containing the combination of organic sulfides and salts of dithiocarbamic acids. Organic sulfides generally are represented by the formula $R_1(S)_nR_2$ wherein $R_1$ and $R_2$ are aliphatic groups and n is 1, 2 or 3.

U.S. Pat. No. 2,805,996 describes the use of amine-dithiocarbamate complexes in lubricating oil compositions, and U.S. Pat. No. 2,947,695 describes the advantages of utilizing mixtures of polyvalent metal dithiocarbamates in preparing oil-soluble additive compositions useful in the preparation of lubricating oils.

SUMMARY OF THE INVENTION

Oil-soluble compositions are described which comprise (A) at least one metal salt of at least one dithiocarbamic acid of the formula

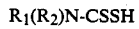

$$R_1(R_2)N\text{-CSSH} \qquad (I)$$

wherein $R_1$ and $R_2$ are each independently hydrocarbyl groups in which the total number of carbon atoms in $R_1$ and $R_2$ is sufficient to render the metal salt oil-soluble, (B) at least one oil-soluble sulfurized organic compound, and (C) at least one auxiliary corrosion-inhibitor.

The sulfurized organic compounds generally are selected from the group of aromatic, alkyl or alkenyl sulfides or polysulfides, sulfurized olefins, sulfurized carboxylic acid esters, sulfurized ester olefins, sulfurized oils, or mixtures thereof. Particular examples of the auxiliary corrosion-inhibitor are the oil-soluble derivatives of dimercaptothiadiazoles. The compositions of the invention also may contain at least one oil-soluble dispersant or detergent. Additive concentrates and lubricating oil compositions containing the oil-soluble compositions of the invention also are described. The oil-soluble compositions of the present invention are useful particularly in lubricating oil formulations which contain little or no phosphorus.

DETAILED DESCRIPTION OF THE PREFERRED EMBODIMENTS

Component (A) of the oil-soluble compositions of the invention is at least one metal salt of at least one dithiocarbamic acid of the formula $$R_1(R_2)N\text{-}CSSH \qquad (I)$$

wherein $R_1$ and $R_2$ are each independently hydrocarbyl groups in which the total number of carbons in $R_1$ and $R_2$ is sufficient to render the metal salt oil-soluble. The hydrocarbyl groups $R_1$ and $R_2$ may be alkyl groups, cycloalkyl groups, aryl groups, alkaryl groups or aralkyl groups. $R_1$ and $R_2$, taken together, may represent the group consisting of polymethylene and alkyl-substituted polymethylene groups thereby forming a cyclic compound with the nitrogen. Generally, the alkyl group will contain at least two carbon atoms. The metal of the metal salt may be a monovalent metal or a polyvalent metal, although polyvalent metals are preferred since it is generally difficult to prepare oil solutions containing the desired quantities of the alkali metal salts. Suitable polyvalent metals include, for example, the alkaline earth metals, zinc, cadmium, magnesium, tin, molybdenum, iron, copper, nickel, cobalt, chromium, lead, etc. The Group II metals are preferred.

In selecting a metal salt of a dithiocarbamic acid to be used in the oil-soluble compositions of the invention, $R_1$, $R_2$, and the metal may be varied so long as the metal salt is adequately oil-soluble. The nature and type of the mineral base stock, and the type of service contemplated for the treated lubricating oil are important modifying influences in the choice of metal salt.

Mixtures of metal salts of dithiocarbamic acids also are contemplated as being useful in the present invention. Such mixtures can be prepared by first preparing mixtures of dithiocarbamic acids and thereafter converting said acid mixtures to metal salts, or alternatively, metal salts of various dithiocarbamic acids can be prepared and thereafter mixed to give the desired product. Thus, the mixtures which can be incorporated in the compositions of the invention may be merely the physical mixture of the different metallic dithiocarbamic compounds or different dithiocarbamate groupings attached to the same polyvalent metal atom.

Examples of alkyl groups are ethyl, propyl, butyl, amyl, hexyl, heptyl, octyl, decyl, dodecyl, tridecyl, pentadecyl and hexadecyl groups including isomeric forms thereof. Examples of cycloalkyl groups include cyclohexyl and cycloheptyl groups, and examples of aralkyl groups include benzyl and phenylethyl. Examples of polymethylene groups include penta- and hexamethylene groups, and examples of alkyl-substituted polymethylene groups include methyl pentamethylene, dimethyl pentamethylene, etc.

Specific examples of the metal dithiocarbamates useful as component (A) in the compositions of this invention include zinc dibutyldithiocarbamate, zinc diamyldithiocarbamate, zinc di(2-ethylhexyl)dithiocarbamate, cadmium dibutyldithiocarbamate, cadmium dioctyldithiocarbamate, cadmium octyl-butyldithiocarbamate, magnesium dibutyldithiocarbamate, magnesium dioctyldithiocarbamate, cadmium dicetyldithiocarbamate, sodium diamyldithiocarbamate, sodium diisopropyldithiocarbamate, etc.

The various metal salts of dithiocarbamic acids utilized in the compositions of this invention are well known in the art and can be prepared by known techniques.

Component (B) of the oil-soluble compositions of the present invention comprises at least one oil-soluble sulfurized organic compound. A wide variety of sulfurized organic compounds can be utilized as component (B) in the compositions of the present invention, and these compounds may generally be represented by the formula $$RS_xR_1 \qquad (II)$$

wherein S represents sulfur, X is a whole number having a value of from 1 to about 10, and R and $R_1$ may be the same or different organic groups. The organic groups may be hydrocarbon groups or substituted hydrocarbon groups containing alkyl, aryl, aralkyl, alkaryl, alkanoate, thiazole, imidazole, phosphorothionate, beta-ketoalkyl groups, etc. The substantially hydrocarbon groups may contain other substituents such as halogen, amino, hydroxyl, mercapto, alkoxy, aryloxy, thio, nitro, sulfonic acid, carboxylic acid, carboxylic acid ester, etc.

Specific examples of types of sulfurized compositions which are useful as component (B) in the compositions of this invention include aromatic, alkyl or alkenyl sulfides and polysulfides, sulfurized olefins, sulfurized carboxylic acid esters, sulfurized ester olefins, sulfurized oil, and mixtures thereof. The preparation of such oil-soluble sulfurized compositions is described in the art.

The sulfurized organic compounds utilized in the present invention may be aromatic and alkyl sulfides such as dibenzyl sulfide, dixylyl sulfide, dicetyl sulfide, diparaffin wax sulfide and polysulfide, cracked wax oleum sulfides, etc. One method of preparing the aromatic and alkyl sulfides includes the condensation of a chlorinated hydrocarbon with an inorganic sulfide whereby the chlorine atom from each of two molecules is displaced, and the free valence from each molecule is joined to a divalent sulfur atom. Generally, the reaction is conducted in the presence of elemental sulfur.

Examples of dialkenyl sulfides which are useful in the compositions of the present invention are described in U.S. Pat. No. 2,446,072. These sulfides can be prepared by interacting an olefinic hydrocarbon containing from 3 to 12 carbon atoms with elemental sulfur in the presence of zinc or a similar metal generally in the form of an acid salt. Examples of sulfides of this type include 6,6'-dithiobis(5-methyl-4-nonene), 2-butenyl monosulfide and disulfide, and 2-methyl-2-butenyl monosulfide and disulfide.

The sulfurized olefins which are useful as component (B) in the compositions of the present invention include sulfurized olefins prepared by the reaction of an olefin (preferably containing 3 to 6 carbon atoms) or a lower molecular weight polyolefin derived therefrom, with a sulfur-containing compound such as sulfur, sulfur monochloride and/or sulfur dichloride, hydrogen sulfide, etc.

The sulfurized organic compounds utilized in the compositions of the present invention may be sulfurized oils which may be prepared by treating natural or synthetic oils including mineral oils, lard oil, carboxylic acid esters derived from aliphatic alcohols and fatty acids or aliphatic carboxylic acids (e.g., myristyl oleate and oleyl oleate) sperm whale oil and synthetic sperm whale oil substitutes and synthetic unsaturated esters or glycerides. Stable sulfurized mineral lubricating oils can be obtained by heating a suitable mineral lubricating oil with from about 1 to about 5% of sulfur at a temperature above about 175° C. and preferably at about 200° to about 260° C. for several hours so as to obtain a reaction product which is substantially non-corrosive to copper. The mineral lubricating oils sulfurized in this manner may be distillate or residual oils obtained from paraffinic, naphthenic or mixed base crudes. Similarly, sulfurized fatty oils such as a sulfurized lard oil can be obtained by heating lard oil with about 10 to 15% of sulfur at a temperature of about 150° C. for a time sufficient to obtain a homogeneous product.

The sulfurized fatty acid esters which are useful in the compositions of this invention can be prepared by reacting sulfur, sulfur monochloride, and/or sulfur dichloride with an unsaturated fatty ester at elevated temperatures. Typical esters include $C_1$–$C_{20}$ alkyl esters of $C_8$–$C_{24}$ unsaturated fatty acids such as palmitoleic oleic, ricinoleic, petroselic, vaccenic, linoleic, linolenic, oleostearic, licanic, etc. Sulfurized fatty acid esters prepared from mixed unsaturated fatty acid esters such as are obtained from animal fats and vegetable oils such as tall oil, linseed oil, olive oil, castor oil, peanut oil, rape oil, fish oil, sperm oil, etc also are useful. Specific examples of the fatty esters which can be sulfurized include lauryl talate, methyl oleate, ethyl oleate, lauryl oleate, cetyl oleate, cetyl linoleate, lauryl ricinoleate, oleolinoleate, oleostearate, and alkyl glycerides.

Another class of organic sulfur-containing compounds which can be used as component (B) in the compositions of the present invention includes sulfurized aliphatic esters of an olefinic monodicarboxylic acid. For example, aliphatic alcohols of from 1 to 30 carbon atoms can be used to esterify monocarboxylic acids such as acrylic acid, methacrylic acid, 2,4-pentadienic acid, etc. or fumaric acid, maleic acid, muconic acid, etc. Sulfurization of these esters is conducted with elemental sulfur, sulfur monochloride and/or sulfur dichloride.

Another class of sulfurized organic compounds can be utilized in the compositions of the invention are diestersulfides characterized by the following general formula

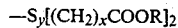  (III)

wherein x is from about 2 to about 5; y is from 1 to about 6, preferably 1 to about 3; and R is an alkyl group having from about 4 to about 20 carbon atoms. The R group may be a straight chain or branched chain group that is large enough to maintain the solubility of the compositions of the invention in oil. Typical diesters include the butyl, amyl, hexyl, heptyl, octyl, nonyl, decyl, tridecyl, myristyl, pentadecyl, cetyl, heptadecyl, stearyl, lauryl, and eicosyl diesters of thiodialkanoic acids such as propionic, butanoic, pentanoic and hexanoic acids. Of the diester sulfides, a specific example is dilauryl, 3,3'-thiodipropionate.

In one preferred embodiment, the sulfurized organic compound utilized in the compositions of the present invention comprise sulfurized olefins. For example, organic polysulfides may be prepared by the sulfochlorination of olefins containing four or more carbon atoms and further treatment with inorganic higher polysulfides according to U.S. Pat. No. 2,708,199.

In one embodiment, sulfurized olefins are produced by (1) reacting sulfur monochloride with a stoichiometric excess of a low carbon atom olefin, (2) treating the resulting product with an alkali metal sulfide in the presence of free sulfur in a mole ratio of no less than 2:1 in an alcohol-water solvent, and (3) reacting that product with an inorganic base. This procedure is described in U.S. Pat. No. 3,471,404, and the disclosure of U.S. Pat. No. 3,471,404 is hereby incorporated by reference for its discussion of this procedure for preparing sulfurized olefins and the sulfurized olefins thus produced. Generally, the olefin reactant contains from about 2 to 5 carbon atoms and examples include ethylene, propylene, butylene, isobutylene, amylene, etc. Briefly, in the first step, sulfur monochloride is reacted with from one to two moles of the olefin per mole of the sulfur monochloride, and the reaction is conducted by mixing the reactants at a temperature of from about 20° to 80° C. In the second step, the product of the first step is reacted with an alkali metal, preferably sodium sulfide, and sulfur. The mixture consists of up to about 2.2 moles of the metal sulfide per gram-atom of sulfur, and the mole ratio of alkali metal sulfide to the product of the first step is about 0.8 to about 1.2 moles of metal sulfide per mole of step (1) product. Generally, the second step is conducted in the presence of an alcohol of an alcohol-water solvent under reflux conditions. The third step of the process is the reaction between the phosphosulfurized olefin which contains from about 1 to about 3% of chlorine with an inorganic base in a water solution. Alkali metal hydroxide such as sodium hydroxide may be used. The reaction is continued until the chlorine content is reduced to below 0.5%, and this reaction is conducted at under reflux conditions for a period of from about 1 to 24 hours.

The sulfurized olefins which are useful in the compositions of the present invention also may be prepared by the reaction, under superatmospheric pressure, of olefinic compounds with a mixture of sulfur and hydrogen sulfide in the presence of a catalyst, followed by removal of low boiling materials. This procedure for preparing sulfurized compositions which are useful in the present invention is described in U.S. Pat. No. 4,191,659, the disclosure of which is hereby incorporated by reference for its description of the preparation of useful sulfurized compositions. An optional final step described in this patent is the removal of active sulfur by, for example, treatment with an alkali metal sulfide.

The olefinic compounds which may be sulfurized by this method and used in the compositions of this invention are diverse in nature. They contain at least one olefinic double bond, which is defined as a non-aromatic double bond; that is, one connecting two aliphatic carbon atoms. In its broadest sense, the olefin may be defined by the formula

  (IV)

wherein each of $R^1$, $R^2$, $R^3$ and $R^4$ is hydrogen or an organic group. In general, the R values in the above formula which are not hydrogen may be satisfied by such groups as —$C(R^5)_3$, —$COOR^5$, —$CON(R^5)_2$, —$COON(R^5)_4$, —COOM, —CN, —X, —$YR^5$ or —Ar, wherein:
each $R^5$ is independently hydrogen, alkyl, alkenyl, aryl, substituted alkyl, substituted alkenyl or substituted aryl, with the proviso that any two $R^5$ groups can be alkylene or substituted alkylene whereby a ring of up to about 12 carbon atoms is formed;

M is one equivalent of a metal cation (preferably Group I or II, e.g., sodium, potassium, barium, calcium);

X is halogen (e.g., chloro, bromo, or iodo);

Y is oxygen or divalent sulfur;

Ar is an aryl or substituted aryl group of up to about 12 carbon atoms.

Any two of $R^1$, $R^2$, $R^3$ and $R^4$ may also together form an alkylene, or substituted alkylene group; i.e., the olefinic compound may be alicyclic.

The natures of the substituents in the substituted moieties described above are not normally critical and any such substituent is useful so long as it is or can be made compatible with lubricating environments and does not interfere under the contemplated reaction conditions. Thus, substituted compounds which are so unstable as to deleteriously decompose under the reaction conditions employed are not contemplated. However, certain substituents such as keto or aldehydo can desirably undergo sulfurization. The selection of suitable substituents is within the skill of the art or may be established through routine testing. Typical of such substituents include any of the above-listed moieties as well as hydroxy, amidine, amino, sulfonyl, sulfinyl, sulfonate, nitro, phosphate, phosphite, alkali metal mercapto and the like.

The olefinic compound is usually one in which each R value which is not hydrogen is independently alkyl, alkenyl or aryl, or (less often) a corresponding substituted group. Monoolefinic and diolefinic compounds, particularly the former, are preferred, and especially terminal monoolefinic hydrocarbons; that is, those compounds in which $R^3$ and $R^4$ are hydrogen and $R^1$ and $R^2$ are alkyl or aryl, especially alkyl (that is, the olefin is aliphatic). Olefinic compounds having about 3 to 30 and especially about 3 to 16 (most often less than 9) carbon atoms are particularly desirable.

Isobutene, propylene and their dimers, trimers and tetramers, and mixtures thereof are especially preferred olefinic compounds. Of these compounds, isobutylene and diisobutylene are particularly desirable because of their availability and the particularly high sulfur-containing compositions which can be prepared therefrom.

Commercial sources of sulfur and hydrogen sulfide are normally used for the purpose of this sulfurization reaction, and impurities normally associated therewith may be present without adverse results. Thus, commercial diisobutene is believed to contain essentially two isomeric forms and this mixture is contemplated for use according to the present invention.

The amounts of sulfur and hydrogen sulfide per mole of olefinic compound are, respectively, about 0.3–3.0 gram-atoms and about 0.1–1.5 moles. The preferred ranges are about 0.5–2.0 gram-atoms and about 0.4–1.25 moles respectively. In batch operations, the reactants are introduced at levels to provide these ranges. In semi-continuous and continuous operations, they may be admixed at any ratio but on a mass balance basis, they are present so as to be consumed in amounts within these ratios. Thus, for example, if the reaction vessel is initially charged with sulfur alone, the olefinic compound and hydrogen sulfide are added incrementally at a rate such that the desired ratio is obtained.

The temperature range in which the sulfurization reaction is carried out is generally about 50°–350° C. The preferred range is about 100°–200° C., with about 125°–180° C. being especially suitable. The reaction is conducted under superatmospheric pressure; this may be and usually is autogenous pressure (i.e., the pressure which naturally develops during the course of the reaction) but may also be externally applied pressure. The exact pressure developed during the reaction is dependent upon such factors as the design and operation of the system, the reaction temperature, and the vapor pressure of the reactants and products and it may vary during the course of the reaction.

It is frequently advantageous to incorporate materials useful as sulfurization catalysts in the reaction mixture. These materials may be acidic, basic or neutral. Useful neutral and acidic materials include acidified clays such as "Super Filtrol", p-toluenesulfonic acid, dialkylphosphorodithioic acids, and phosphorus sulfides such as phosphorus pentasulfide.

The preferred catalysts are basic materials. These may be inorganic oxides and salts such as sodium hydroxide, calcium oxide and sodium sulfide. The most desirable basic catalysts, however, are nitrogen bases including ammonia and amines. The amines include primary, secondary and tertiary hydrocarbyl amines wherein the hydrocarbyl radicals are alkyl, aryl, aralkyl, alkaryl or the like and contain about 1–20 carbon atoms. Suitable amines include aniline, benzylamine, dibenzylamine, dodecylamine, naphthylamine, tallow amines, N-ethyldipropylamine, N-phenylbenzylamine, N,N-diethylbutylamine, m-toluidine and 2,3-xylidine. Also useful are heterocyclic amines such as pyrrolidine, N-methylpyrrolidine, piperidine, pyridine and quinoline.

The preferred basic catalysts include ammonia and primary, secondary, or tertiary alkylamines having about 1 to 8 carbon atoms in the alkyl radicals. Representative amines of this type are methylamine, dimethylamine, trimethylamine, ethylamine, diethylamine, triethylamine, di-n-butylamine, tri-n-butylamine, tri-sec-hexylamine and tri-n-octylamine. Mixtures of these amines can be used, as well as mixtures of ammonia and amines.

The amount of catalytic material used is generally about 0.05–2.0% of the weight of the olefinic compound. In the case of the preferred ammonia and amine catalysts, about 0.0005–0.5 mole per mole of olefin is preferred, and about 0.001–0.1 mole is especially desirable.

Also present in the reaction mixture may be water, either as a catalyst or as a diluent for one or more of the catalysts recited hereinabove. The amount of water, when present, is usually about 1–25% by weight of the olefinic compound. The presence of water is, however, not essential and when certain types of reaction equipment are used it may be advantageous to conduct the reaction under substantially anhydrous conditions.

The method is usually carried out in the absence of solvents and diluents other than water. However, it may sometimes be desirable to use a substantially inert, normally liquid organic diluent in the reaction. The nature of suitable diluents will readily be apparent to those skilled in the art.

The time required for the reaction to be completed will vary depending on the reagents, ratios thereof, the reaction temperature, the presence or absence of catalysts, and the purity of the reagents. The course of the reaction is conveniently followed by monitoring the pressure in the reaction vessel; the reaction can be considered complete when the pressure levels off to a constant value.

Following the preparation of the sulfurized mixture by the procedure described hereinabove, substantially all low boiling materials are removed. The nature of these low boiling mateials will vary according to the amount and type of reactants used and the reaction conditions. It will also vary to some extent according to the use to which the sulfurized product is to be put, as well as such things as odor and flammability considerations, recycling needs of reactants and by-products, and the like. Most often, the product should have a flash point above about 30° C., preferably about 70° C. and desirably above about 100° C. as determined by ASTM Procedure D93. Reference is also made to ASTM Procedures D56 and D1310.

In addition to starting materials such as the olefinic compound, the low boiling materials will often include mercaptans and monosulfides, especially when the starting olefin contains less than 9 carbon atoms, and under these circumstances it is preferred that the product contain no more than about 5% by weight of such starting materials, mercaptans and monosulfides. If these materials are gaseous at ambient pressure and temperature, they may be removed in part simply by venting the reaction vessel, and they may be recycled if desired. In the case of less volatile starting materials, it may be necessary to resort to such techniques as distillation at atmospheric pressure or vacuum distillation or stripping. Another useful method is the passage of an inert gas such as nitrogen through the mixture at a suitable temperature and pressure. Large-scale gas chromatography and molecular distillation may also be useful.

Any solids present in the reaction mixture may be conveniently removed, in most instances, by merely pouring off the liquid product. If further removal of solids is desired, such conventional techniques as filtration or centrifugation may be used.

A further optional step in the method of this invention is the treatment of the sulfurized product, obtained as described hereinabove, to reduce active sulfur. By "active sulfur" is meant sulfur in a form which can cause straining of copper and similar materials. When active sulfur is to be reduced, any of several methods known in the art may be employed. An illustrative method is treatment with an alkali metal sulfide as described in U.S. Pat. No. 3,498,915.

Other optional treatments may be employed to improve such qualities as the odor, color and staining characteristics of the sulfurized compositions. These may include treatment with acidic clays such as Super Filtrol and filtration through fuller's earth, activated charcoal, alumina clays or the like. Such treatments are often not required when a basic catalyst is employed.

The exact chemical nature of the sulfurized compositions prepared in this manner is not known with certainty, and it is most convenient to describe them in terms of the method for their preparation. It appears, however, that when prepared from olefins containing less than 9 and particularly less than 7 carbon atoms, they comprise principally disulfides, trisulfides and tetrasulfides. The sulfur content of these sulfurized compositions is usually about 2-60% by weight, preferably about 25-60% and most desirably about 40-50%.

The method of preparing sulfurized olefins in this manner is illustrated by the following examples. Unless otherwise indicated in these and the other examples to follow, and in other parts of the specification and claims, all parts and percentages are by weight.

EXAMPLE I

Sulfur (526 parts, 16.4 moles) is charged to a jacketed high pressure reactor which is fitted with an agitator and internal cooling coils. Refrigerated brine is calculated through the coils to cool the reactor prior to the introduction of the gaseous reactants. After sealing the reactor, evacuating to about 2 torr and cooling, 920 parts (16.4 moles) of isobutene and 279 parts (8.2 moles) of hydrogen sulfide are charged to the reactor. The reactor is heated using steam in the external jacket, to a temperature of about 182° C. over about 1.5 hours. A maximum pressure of 1350 psig is reached at about 168° C. during this heat-up. Prior to reaching the peak reaction temperature, the pressure starts to decrease and continues to decrease steadily as the gaseous reactants are consumed. After about 10 hours at a reaction temperature of about 182° C., the pressure is 310-340 psig and the rate of pressure change is about 5-10 psig per hour. The unreacted hydrogen sulfide and isobutene are vented to a recovery system. After the pressure in the reactor has decreased to atmospheric, the sulfurized mixture is recovered as a liquid.

The mixture is blown with nitrogen at about 100° C. to remove low boiling materials including unreacted isobutene, mercaptans and monosulfides. The residue after nitrogen blowing is agitated with 5% Super Filtrol and filtered, using a diatomaceous earth filter aid. The filtrate is the desired sulfurized composition which contains 42.5% sulfur.

EXAMPLE II

Sulfur (151 parts) are charged to a reactor similar to the one described in Example I. The sulfur is heated to 160° C. and the reactor is sealed and evacuated. Hydrogen sulfide (72 parts) are added slowly to the reactor over a period of about 4.5 hours. Thereafter, 1.6 parts of the catalyst n-butylamine is added to the reactor after bout 3.8 parts of hydrogen sulfide is added. Isobutylene (157 parts) are added slowly to the reactor containing the sulfur, catalyst, and about 10 parts of hydrogen sulfide in such a manner that the rates of addition of isobutylene and hydrogen sulfide are such as to maintain 10% molar excess of hydrogen sulfide until all the hydrogen sulfide is added. The addition of the remainder of isobutylene is continued until the entire 157 parts are added. The temperature is maintained in the range of between 160°-171° C. throughout the foregoing additions and reactions with occasional cooling being necessary. The reaction is held for 5 hours at 171° C., then unreacted hydrogen sulfide and isobutylene are vented to a recovery system until the pressure in the vessel is reduced to atmospheric. Separation of low boiling materials from the reaction crude is accomplished by nitrogen blowing, then vacuum stripping. The residue is then filtered. The filtrate is the desired sulfurized composition containing 47% sulfur by weight.

In another preferred embodiment, the sulfurized organic compound (component (B)) is derived from a particular type of cyclic or bicyclic olefin which is a Diels-Alder adduct of at least one dienophile with at least one aliphatic conjugated diene. The sulfurized Diels-Alder adducts can be prepared by reacting various sulfurizing agents with the Diels-Alder adducts as described more fully below. Preferably, the sulfurizing agent is sulfur.

The Diels-Alder adducts are a well-known, art-recognized class of compounds prepared by the diene synthesis of Diels-Alder reaction. A summary of the prior art relating to this class of compounds is found in the Russian monograph, *Dienovyi Sintes,* Izdatelstwo Akademii Nauk SSSR, 1963 by A. S. Onischenko. (Translated into the English language by L. Mandel as A. S. Onischenko, *Diene Synthesis,* N.Y., Daniel Davey and Co., Inc., 1964.) This monograph and references cited therein are incorporated by reference into the present specification.

Basically, the diene synthesis (Diels-Alder reaction) involves the reaction of at least one conjugated diene, >C=C—C=C<, with at least one ethylenically or acetylenically unsaturated compound, >C=C< or —C≡C—, these latter compounds being known as dienophiles. The reaction can be represented as follows:

Reaction 1:

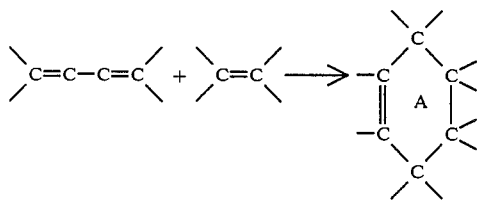

Reaction 2:

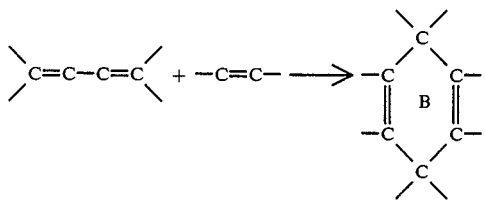

The products, A and B are commonly referred to as Diels-Alder adducts. It is these adducts which are used as starting materials for the preparation of the sulfurized Diels-Alder adducts utilized in the invention.

Representative examples of the 1,3-dienes include aliphatic and alicyclic conjugated diolefins or dienes of the formula

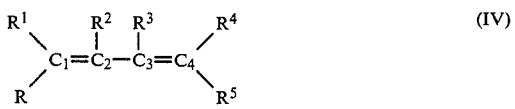

wherein R through $R^5$ are each independently selected from the group consisting of halogen, alkyl, halo, alkoxy, alkenyl, alkenyloxy, carboxy, cyano, amino, alkylamino, dialkylamino, phenyl, and phenylsubstituted with 1 to 3 substituents corresponding to R through $R^5$ with the proviso that a pair of R's on adjacent carbons do not form an additional double bond in the diene, or R, $R^2$, $R^3$ and $R^5$ are as defined and $R^1$ and $R^4$ are alkylene groups joined together to form a ring including the nitrogen atom. Preferably not more than three of the R variables are other than hydrogen and at least one is hydrogen. Normally the total carbon content of the diene will not exceed 20. In one preferred aspect of the invention, adducts are used where $R^2$ and $R^3$ are both hydrogen and at least one of the remaining R variables is also hydrogen. Preferably, the carbon content of these R variables when other than hydrogen is 7 or less. In this most preferred class, those dienes where R, $R^1$, $R^4$, and $R^5$ are hydrogen, chloro, or lower alkyl are especially useful. Specific examples of the R variables include the following groups: methyl, ethyl, phenyl, HOOC—, N≡C—, $CH_3O$—, $CH_3COO$—, $CH_3CH_2O$—, $CH_3C(O)$—, $HC(O)$—, Cl, Br, tert-butyl, $CF_3$, tolyl, etc. Piperylene, isoprene, methylisoprene, chloroprene, and 1,3-butadiene are among the preferred dienes for use in preparing the Diels-Alder adducts.

In addition to these linear 1,3-conjugated dienes, cyclic dienes are also useful as reactants in the formation of the Diels-Alder adducts. Examples of these cyclic dienes are the cyclopentadienes, fulvenes 1,3-cyclohexadienes, 1,3-cycloheptadienes, 1,3,5-cycloheptatrienes, cyclooctatetraene, and 1,3,5-cyclononatrienes. Various substituted derivatives of these compounds enter into the diene synthesis.

The dienophiles suitable for reacting with the above dienes to form the adducts used as reactants can be represented by the formula

wherein the K variables are the same as the R variables in Formula IV above with the proviso that a pair of K's may form an additional carbon-to-carbon bond, i.e., K—C≡C—$K_2$, but do not necessarily do so.

A preferred class of dienophiles are those wherein at least one of the K variables is selected from the class of electron-accepting groups such as formyl, cyano, nitro, carboxy, carbohydrocarbyloxy, hydrocarbylcarbonyl, hydrocarbylsulfonyl, carbamyl, acylcarbamyl, N-acyl-N-hydrocarbylcarbamyl, N-hydrocarbylcarbamoyl, and N,N-dihydrocarbylcarbamyl. Those K variables which are not electron-accepting groups are hydrogen, hydrocarbyl, or substituted-hydrocarbyl groups. Usually the hydrocarbyl and substituted hydrocarbyl groups will not contain more than 10 carbon atoms each.

The hydrocarbyl groups present as N-hydrocarbyl substituents are preferably alkyl of 1 to 30 carbons and especially 1 to 10 carbons. Representative of this class of dienophiles are the following: nitroalkenes, e.g., 1-nitrobutene-1, 1-nitropentene-1, 3-methyl-1-nitrobutene-1, 1-nitroheptene-1, 1-nitrooctene-1, 4-ethoxy-1-nitrobutene-1; alpha, beta-ethylenically unsaturated aliphatic carboxylic acid esters, e.g., alkylacrylates and alpha-methyl alkylacrylates (i.e., alkyl methacrylates) such as butylacrylate and butylmethacrylate, decyl acrylate and decylmethacrylate, di-(n-butyl)maleate, di-(t-butyl-maleate); acrylonitrile, methacrylonitrile, beta-nitrostyrene, methylvinylsulfone, acrolein, acrylic acid; alpha, beta-ethylenically unsaturated aliphatic carboxylic acid amides, e.g., acrylamide, N,N-dibutylacrylamide, methacrylamide, N-dodecylmethacrylamide, N-pentylcrotonamide; crotonaldehyde, crotonic acid, beta, beta-dimethyldivinylketone, methyl-vinylketone, N-vinyl pyrrolidone, alkenyl halides, and the like.

One preferred class of dienophiles are those wherein at least one, but not more than two of K variables is —C(O)O—$R_o$ where $R_o$ is the residue of a saturated aliphatic alcohol of up to about 40 carbon atoms; e.g., for example at least one K is carbohydrocarbyloxy such as carboethoxy, carbobutoxy, etc., the aliphatic alcohol from which —$R_o$ is derived can be a mono or polyhydric alcohol such as alkyleneglycols, alkanols, aminoalkanols, alkoxy-substituted alkanols, ethanol, ethoxy ethanol, propanol, beta-diethylaminoethanol, dodecyl alcohol, diethylene glycol, tripropylene glycol, tetrabutylene glycol, hexanol, octanol, isooctyl alcohol, and the like. In this especially preferred class of dienophiles, not more than two K variables will be —C(O)—O—$R_o$ groups and the remaining K variables will be hydrogen or lower alkyl, e.g., methyl, ethyl, propyl, isopropyl, and the like.

Specific examples of dienophiles of the type discussed above are those wherein at least one of the K variables is one of the following groups: hydrogen, methyl, ethyl, phenyl, HOOC—, HC(O)—, $CH_2$=CH—, HC≡C—, $CH_3$C(O)O—, $ClCH_2$—, $HOCH_2$—, alpha-pyridyl, —$NO_2$, Cl, Br, propyl, iso-butyl, etc.

In addition to the ethylenically unsaturated dienophiles, there are many useful acetylenically unsaturated dienophiles such as propiolaldehyde, methylethynylketone, propylethynylketone, propenylethynylketone, propiolic acid, propiolic acid nitrile, ethylpropiolate, tetrolic acid, propargylaldehyde, acetylenedicarboxylic acid, the dimethyl ester of acetylenedicarboxylic acid, dibenzoylacetylene, and the like.

Cyclic dienophiles include cyclopentenedione, coumarin, 3-cyanocoumarin, dimethyl maleic anhydride, 3,6-endomethylene-cyclohexenedicarboxylic acid, etc. With the exception of the unsaturated dicarboxylic anhydrides derived from linear dicarboxylic acids (e.g., maleic anhydride, methylmaleic anhydride, chloromaleic anhydride), this class of cyclic dienophiles are limited in commercial usefulness due to their limited availability and other economic considerations.

The reaction products of these dienes and dienophiles correspond to the general formulae

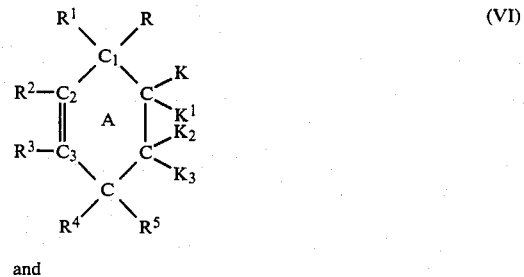

and

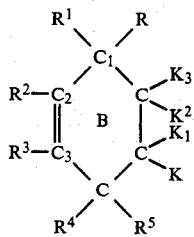

wherein R through $R^5$ and K through $K_3$ are as defined hereinbefore. If the dienophile moiety entering into the reaction is acetylenic rather than ethylenic, two of the K variables, one from each carbon, form another carbon-to-carbon double bond. Where the diene and/or the dienophile is itself cyclic, the adduct obviously will be bicyclic, tricyclic, fused, etc., as exemplified below:

Reaction 3:

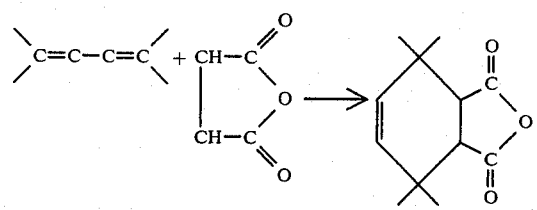

Reaction 4:

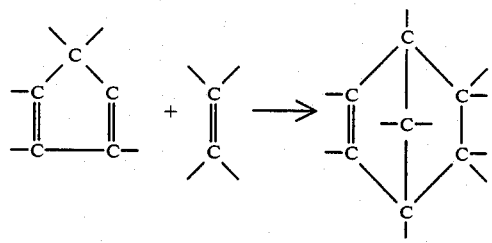

Normally, the adducts involve the reaction of equimolar amounts of diene and dienophile. However, if the dienophile has more than one ethylenic linkage, it is possible for additional diene to react if present in the reaction mixture.

The adducts and processes of preparing the adducts are further exemplified by the following examples.

EXAMPLE A

A mixture comprising 400 parts of toluene and 66.7 parts of aluminum chloride is charged to a two-liter flask fitted with a stirrer, nitrogen inlet tube, and a solid carbon dioxide-cooled reflux condenser. A second mixture comprising 640 parts (5 moles) of butyl acrylate and 240.8 parts of toluene is added to the $AlCl_3$ slurry while maintaining the temperature within the range of 37°–58° C. over a 0.25-hour period. Thereafter, 313 parts (5.8 moles) of butadiene is added to the slurry over a 2.75-hour period while maintaining the temperature of the reaction mass at 50°–61° C. by means of external cooling. The reaction mass is blown with nitrogen for about 0.33 hour and then transferred to a four-liter separatory funnel and washed with a solution of 150 parts of concentrated hydrochloric acid in 1100 parts of water. Thereafter, the product is subjected to two additional water washings using 1000 parts of water for each wash. The washed reaction product is subsequently distilled to remove unreacted butyl acrylate and toluene. The residue of this first distillation step is subjected to further distillation at a pressure of 9–10 millimeters of mercury whereupon 785 parts of the desired product is collected over the temperature of 105°–115° C.

EXAMPLE B

The adduct of isoprene and acrylonitrile is prepared by mixing 136 parts of isoprene, 106 parts of acrylonitrile, and 0.5 parts of hydroquinone (polymerization inhibitor) in a rocking autoclave and thereafter heating for 16 hours at a temperature within the range of 130°–140° C. The autoclave is vented and the contents decanted thereby producing 240 parts of a light yellow liquid. This liquid is stripped at a temperature of 90° C. and a pressure of 10 millimeters of mercury thereby yielding the desired liquid product as the residue.

EXAMPLE C

Using the procedure of Example B, 136 parts of isoprene, 172 parts of methyl acrylate, and 0.9 part of hydroquinone are converted to the isoprenemethyl acrylate adduct.

EXAMPLE D

Following the procedure of Example B, 104 parts of liquified butadiene, 166 parts of methyl acrylate, and 1 part of hydroquinone are charged to the rocking autoclave and heated to 130°-135° C. for 14 hours. The product is subsequently decanted and stripped yielding 237 parts of the adduct.

EXAMPLE E

The adduct of isoprene and methyl methacrylate is prepared by reacting 745 parts of isoprene with 1095 parts of methyl methacrylate in the presence of 5.4 parts of hydroquinone in the rocking autoclave following the procedure of Example B above. 1490 parts of the adduct is recovered.

EXAMPLE F

The adduct of butadiene and dibutyl maleate (810 parts) is prepared by reacting 915 parts of dibutyl maleate, 216 parts of liquified butadiene, and 3.4 parts of hydroquinone in the rocking autoclave according to the technique of Example B.

EXAMPLE G

A reaction mixture comprising 378 parts of butadiene, 778 parts of N-vinylpyrrolidone, and 3.5 parts of hydroquinone is added to a rocking autoclave previously chilled to −35° C. The autoclave is then heated to a temperature of 130°-140° C. for about 15 hours. After venting, decanting, and stripping the reaction mass, 75 parts of the desired adduct are obtained.

EXAMPLE H

Following the technique of Example B, 270 parts of liquified butadiene, 1060 parts of isodecyl acrylate, and 4 parts of hydroquinone are reacted in the rocking autoclave at a temperature of 130°-140° C. for about 11 hours. After decanting and stripping, 1136 parts of the adduct are recovered.

EXAMPLE I

Following the same general procedure of Example A, 132 parts (2 moles) of cyclopentadiene, 256 parts (2 moles) of butyl acrylate, and 12.8 parts of aluminum chloride are reacted to produce the desired adduct. The butyl acrylate and the aluminum chloride are first added to a two-liter flask fitted with stirrer and reflux condenser. While heating the reaction mass to a temperature within the range of 59°-52° C., the cyclopentadiene is added to the flask over a 0.5-hour period. Thereafter the reaction mass is heated for about 7.5 hours at a temperature of 95°-100° C. The product is washed with a solution containing 400 parts of water and 100 parts of concentrated hydrochloric acid and the aqueous layer is discarded. Thereafter, 1500 parts of benzene are added to the reaction mass and the benzene solution is washed with 300 parts of water and the aqueous phase removed. The benzene is removed by distillation and the residue stripped at 0.2 parts of mercury to recover the adduct as a distillate.

EXAMPLE J

Following the technique of Example B, the adduct of butadiene and allylchloride is prepared using two moles of each reactant.

EXAMPLE K

One-hundred thirty-nine parts (1 mole) of the adduct of butadiene and methyl acrylate is transesterified with 158 parts (1 mole) of decyl alcohol. The reactants are added to a reaction flask and 3 parts of sodium methoxide are added. Thereafter, the reaction mixture is heated at a temperature of 190°-200° C. for a period of 7 hours. The reaction mass is washed with a 10% sodium hydroxide solution and then 250 parts of naphtha is added. The naphtha solution is washed with water. At the completion of the washing, 150 parts of toluene are added and the reaction mass is stripped at 150° C. under pressure of 28 parts of mercury. A dark-brown fluid product (225 parts) is recovered. This product is fractionated under reduced pressure resulting in the recovery of 178 parts of the product boiling in the range of 130°-133° C. at a pressure of 0.45 to 0.6 parts of mercury.

EXAMPLE L

The general procedure of Example A is repeated except that only 270 parts (5 moles) of butadiene is included in the reaction mixture.

The sulfur-containing compounds are readily prepared by heating a mixture of a sulfurizing agent such as sulfur, and at least one of the Diels-Alder adducts of the types discussed hereinabove at a temperature within the range of from about 110° C. to just below the decomposition temperature of the Diels-Alder adducts. Temperatures within the range of about 110° to about 200° C. will normally be used. This reaction results in a mixture of products, some of which have been identified. In the compounds of known structure, the sulfur reacts with the substituted unsaturated cycloaliphatic reactants at a double bond in the nucleus of the unsaturated reactant.

The molar ratio of sulfur to Diels-Alder adduct used in the preparation of the sulfur-containing composition is from about 0.5:1 to about 10:1 although the molar ratio generally will be less than about 4:1. In one embodiment of the invention, the molar ratio is less than about 1.7:1 and more preferably less than about 1:1.

The sulfurizing reaction can be conducted in the presence of suitable inert organic solvents such as mineral oils, alkanes of 7 to 18 carbons, etc., although no solvent is generally necessary. After completion of the reaction, the reaction mass can be filtered and/or subjected to other conventional purification techniques. There is no need to separate the various sulfur-containing products as they can be employed in the form of a reaction mixture comprising the compounds of known and unknown structure.

As hydrogen sulfide is an undesirable contaminent, it is advantageous to employ standard procedures for assisting in the removal of the H$_2$S from the products. Blowing with steam, alcohols, air, or nitrogen gas assists in the removal of H$_2$S as does heating at reduced pressures with or without the blowing.

It is sometimes advantageous to incorporate materials useful as sulfurization catalysts in the reaction mixture. These materials may be acidic, basic or neutral. Useful neutral and acidic materials include acidified clays such as "Super Filtrol", p-toluenesulfonic acid, dialkylphosphorodithioic acids, phosphorus sulfides such as phosphorus pentasulfide and phosphites such as triaryl phosphites (e.g., triphenyl phosphite).

The basic materials may be inorganic oxides and salts such as sodium hydroxide, calcium oxide and sodium sulfide. The most desirable basic catalysts, however, are nitrogen bases including ammonia and amines. The amines include primary, secondary and tertiary hydrocarbyl amines wherein the hydrocarbyl radicals are alkyl, aryl, aralkyl, alkaryl or the like and contain about 1-20 carbon atoms. Suitable amines include aniline, benzylamine, dibenzylamine, dodecylamine, naphthylamine, tallow amines, N-ethyldipropylamine, N-phenylbenzylamine, N,N-diethylbutylamine, m-toluidine and 2,3-xylidine. Also useful are heterocyclic amines such as pyrrolidine, N-methylpyrrolidine, piperidine, pyridine and quinoline.

The preferred basic catalysts include ammonia and primary, secondary, or tertiary alkylamines having about 1-8 carbon atoms in the alkyl radicals. Repesentative amines of this type are methylamine, dimethylamine, trimethylamine, ethylamine, diethylamine, triethylamine, di-n-butylamine, tri-n-butylamine, tri-sec-hexylamine and tri-n-octylamine. Mixtures of these amines can be used, as well as mixtures of ammonia and amines.

When a catalyst is used, the amount is generally about 0.05-2.0% of the weight of the adduct.

The following examples illustrate the preparation of the sulfur-containing compounds derived from Diels-Alder adducts.

EXAMPLE III

To 255 parts (1.65 moles) of the isoprenemethacrylate adduct of Example C heated to a temperature of 110°-120° C., there are added 53 parts (1.65 moles) of sulfur flowers over a 45-minute period. The heating is continued for 4.5 hours at a temperature in the range of 130°-160° C. After cooling to room temperature, the reaction mixture is filtered through a medium sintered glass funnel. The filtrate consists of 301 parts of the desired sulfur-containing products.

EXAMPLE IV

A reaction mixture comprising 1175 parts (6 moles) of the Diels-Alder adduct of butyl acrylate and isoprene and 192 parts (6 moles) of sulfur flowers is heated for 0.5 hour at 108°-110° C. and then to 155°-165° C. for 6 hours while bubbling nitrogen gas through the reaction mixture at 0.25 to 0.5 standard cubic feet per hour. At the end of the heating period, the reaction mixture is allowed to cool and filtered at room temperature. Thereafter, the product is permitted to stand for 24 hours and refiltered. The filtrate is the desired product.

EXAMPLE V

Sulfur (4.5 moles) and the adduct of isoprene-methyl methacrylate (4.5 moles) are mixed at room temperature and heated for one hour at 110° C. while blowing nitrogen through the reaction mass at 0.25-0.5 standard cubic feet per hour. Subsequently the reaction mixture is raised to a temperature of 150°-155° C. for 6 hours while maintaining the nitrogen blowing. After heating, the reaction mass is permitted to stand for several hours while cooling to room temperature and is thereafter filtered. The filtrate consists of 842 parts of the desired sulfur-containing product.

EXAMPLE VI

A one-liter flask fitted with a stirrer, reflux, condenser, and nitrogen inlet line is charged with 256 parts (1 mole) of the adduct of butadiene and isodecyl acrylate, and 51 grams (1.6 moles) of sulfur flowers and then heated for 12 hours at a temperature, stand for 21 hours, and filtered at room temperature to produce the desired product as the filtrate.

EXAMPLE VII

A mixture of 1703 parts (9.4 moles) of a butyl acrylate-butadiene adduct prepared as in Example L, 280 parts (8.8 moles) of sulfur and 17 parts of triphenyl phosphite is prepared in a reaction vessel and heated gradually over 2 hours to a temperature of about 185° C. while stirring and sweeping with nitrogen. The reaction is exothermic near 160°-170° C., and the mixture is maintained at about 185° C. for 3 hours. The mixture is cooled to 90° C. over a period of 2 hours and filtered using a filter aid. The filtrate is the desired product containing 14.0% sulfur.

EXAMPLE VIII

The procedure of Example VII is repeated except that the triphenyl phosphite is omitted from the reaction mixture.

EXAMPLE IX

The procedure of Example VII is repeated except that the triphenyl phosphite is replaced by 2.0 parts of triamyl amine as a sulfurization catalyst.

EXAMPLE X

A mixture of 547 parts of a butyl acrylatebutadiene adduct prepared as in Example L and 5.5 parts of triphenyl phosphite is prepared in a reaction vessel and heated with stirring to a temperature of about 50° C. whereupon 94 parts of sulfur are added over a period of 30 minutes. The mixture is heated to 150° C. in 3 hours while sweeping with nitrogen. The mixture then is heated to about 185° C. in approximately one hour. The reaction is exothermic and the temperature is maintained at about 185° C. by using a cold water jacket for a period of about 5 hours. At this time, the contents of the reaction vessel are cooled to 85° C. and 33 parts of mineral oil are added. The mixture is filtered at this temperature, and the filtrate is the desired product wherein the sulfur to adduct ratio is 0.98/1.

EXAMPLE XI

The general procedure of Example X with the exception that the triphenyl phosphite is not included in the reaction mixture.

EXAMPLE XII

A mixture of 500 parts (2.7 moles) of a butyl acrylate-butadiene adduct prepared as in Example L and 109 parts (3.43 moles) of sulfur is prepared and heated to 180° C. and maintained at a temperature of about 180°-190° C. for about 6.5 hours. The mixture is colled while sweeping with a nitrogen gas to remove hydrogen sulfide odor. The reaction mixture is filtered and the filtrate is the desired product containing 15.8% sulfur.

EXAMPLE XIII

A mixture of 728 parts (4.0 moles) of a butyl acrylate-butadiene adduct prepared as in Example L, 218 parts (6.8 moles) of sulfur, and 7 parts of triphenyl phosphite is prepared and heated with stirring to a temperature of about 181° C. over a period of 1.3 hours. The mixture is maintained under a nitrogen purge at a temperature of 181°–187° C. for 3 hours. After allowing the material to cool to about 85° C. over a period of 1.4 hours, the mixture is filtered using a filter aid, and the filtrate is the desired product containing 23.1% sulfur.

EXAMPLE XIV

A mixture of 910 parts (5 moles) of a butyl acrylate-butadiene adduct prepared as in Example L, 208 parts (6.5 moles) of sulfur and 9 parts of triphenyl phosphite is prepared and heated with stirring and nitrogen sweeping to a temperature of about 140° C. over 1.3 hours. The heating is continued to raise the temperature to 187° C. over 1.5 hours, and the material is held at 183°–187° C. for 3.2 hours. After cooling the mixture to 89° C., the mixture is filtered with a filter aid, and the filtrate is the desired product containing 18.2% sulfur.

EXAMPLE XV

The mixture of 910 parts (5 moles) of a butyl acrylate-butadiene adduct prepared as in Example L, 128 parts (4 moles) of sulfur and 9 parts of triphenyl phosphite is prepared and heated with stirring while sweeping with nitrogen to a temperature of 142° C. over a period of about one hour. The heating is continued to raise the temperature to 185°–186° C. over about 2 hours and the mixture is maintained at 185°–187° C. for 3.2 hours. After allowing the reaction mixture to cool to 96° C., the mixture is filtered with filter aid, and the filtrate is the desired product containing 12.0% sulfur.

EXAMPLE XVI

The general procedure of Example XV is repeated except that the mixture contain 259 parts (8.09 moles) of sulfur. The product obtained in this manner contains 21.7% sulfur.

EXAMPLE XVII

A reaction mixture comprising 1175 grams (6 moles) of the Diels-Alder adduct of butylacrylate and isoprene and 384 grams (12 moles) of sulfur flowers is heated for 0.5 hour at 1.08°–110° C. and then to 155°–165° for 6 hours while bubbling nitrogen gas through the reaction mixture at 0.25 to 0.5 standard cubic feet per hour. At the end of the heating period, the reaction mixture is allowed to cool and be filtered at room temperature. Thereafter, the product is permitted to stand for 24 hours and refiltered. The filtrate weighing 1278 grams is the desired product.

EXAMPLES XVIII–XXII

Examples XVIII through XXII illustrate the preparation of other sulfur-containing compounds useful in the present invention. In each case, the adduct and the sulfur are mixed in a reaction flask and thereafter heated to a temperature within the range of 150°–160° C. for a period of 7 to 10 hours while bubbling nitrogen through the reaction mixture. The sulfurized products are then permitted to cool to room temperature and allowed to stand for several hours. Thereafter, the reaction mass is filtered, the filtrate representing the desired sulfur-containing products.

| | Adduct of Example | Molar Ratio of Sulfur to Adduct |
|---|---|---|
| XVIII | 3 | 2:1 |
| XIX | 2 | 2:1 |
| XX | 10 | 4:1 |
| XXI | 8 | 4:1 |
| XII | 11 | 5:1 |

It has been found that, if these sulfur-containing products are treated with an aqueous solution of sodium sulfide containing from about 5% to about 75% by weight Na$_2$S, the treated product may exhibit less of a tendency to darken freshly polished copper metal.

Treatment involves the mixing together of the sulfurized reaction product and the sodium sulfide solution for a period of time sufficient for any unreacted sulfur to be scavenged, usually a period of a few minutes to several hours depending on the amount of unreacted sulfur, the quantity and the concentration of the sodium sulfide solution. The temperature is not critical but normally will be in the range of about 20° C. to about 100° C. After the treatment, the resulting aqueous phase is separated from the organic phase by conventional techniques, i.e., decantation, etc. Other alkali metal sulfides, M$_2$S$_x$ where M is an alkali metal and x is 1, 2, or 3 may be used to scavenge unreacted sulfur but those where x is greater than 1 are not nearly as effective. Sodium sulfide solutions are preferred for reasons of economy and effectiveness. This procedure is described in more detail in U.S. Pat. No. 3,498,915.

It has also been determined that treatment of the reaction products with solid, insoluble acidic materials such as acidified clays or acidic resins and thereafter filtering the sulfurized reaction mass improves the product with respect to its color and solubility characteristics. Such treatment comprises thoroughly mixing the reaction mixture with from about 0.1% to about 10% by weight of the solid acidic material at a temperature of about 25°–150° C. and subsequently filtering the product.

As previously mentioned, there is no need to separate the sulfur-containing products which are produced in the above reactions. The reaction product is a mixture which comprises the compounds whose structures have been ascertained but which also comprises compounds whose structures are unknown. Since it is economically unfeasible to separate the components of the reaction mixture, they are employed in combination as a mixture of sulfur-containing compounds.

In order to remove the last traces of impurities from the reaction mixture, particularly when the adduct employed was prepared using a Lewis acid catalyst, (e.g., AlCl$_3$) it is sometimes desirable to add an organic inert solvent to the liquid reaction product and, after thorough mixing, to refilter the material. Subsequently the solvent is stripped from the product. Suitable solvents include solvents of the type mentioned hereinabove such as benzene, toluene, the higher alkanes, etc. A particularly useful class of solvents are the textile spirits.

In addition, other conventional purification techniques can be advantageously employed in purifying sulfurized products used in this invention. For example, commercial filter aids can be added to the materials prior to filtration to increase the efficiency of the filtration. Filtering through diatomaceous earth is particularly useful where the use contemplated requires the removal of substantially all solid materials. However, such expedients are well known to those skilled in the art and require no elaborate discussion herein.

The sulfurized composition used in the present invention (component (B) may be at least one sulfurized terpene compound or a composition prepared by sulfurizing a mixture comprising at least one terpene and at least one other olefinic compound.

The term "terpene compound" as used in the specification and claims is intended to include the various isomeric terpene hydrocarbons having the empirical formula $C_{10}H_{16}$, such as contained in turpentine, pine oil and dipentenes, and the various synthetic and naturally occuring oxygen-containing derivatives. Mixtures of these various compounds generally will be utilized, especially when natural products such as pine oil and turpentine are used. Pine oil, for example, which is obtained by destructive distillation of waste pine wood with super-heated steam comprises a mixture of terpene derivatives such as alpha-terpineol, beta-terpineol, alpha-fenchol, camphor, borneol/isoborneol, fenchone, estragole, dihydro alpha-terpineol, anethole, and other mono-terpene hydrocarbons. The specific ratios and amounts of the various components in a given pine oil will depend upon the particular source and the degree of purification. A group of pine oil-derived products are available commercially from Hercules Incorporated. It has been found that the pine oil products generally known as terpene alcohols available from Hercules Incorporated are particularly useful in the preparation of the sulfurized products used in the invention. Examples of such products include alpha-Terpineol containing about 95-97% of alpha-terpineol, a high purity tertiary terpene alcohol mixture typically containing 96.3% of tertiary alcohols; Terpineol 318 Prime which is a mixture of isomeric terpineols obtained by dehydration of terpene hydrate and contains about 60-65 weight percent of alpha-terpineol and 15-20% beta-terpineol, and 18-20% of other tertiary terpene alcohols. Other mixtures and grades of useful pine oil products also are available from Hercules under such designations as Yarmor 302, Herco pine oil, Yarmor 302W, Yarmor F and Yarmor 60.

The terpene comounds which can be utilized in the compositions of the present invention may be sulfurized terpene compounds, sulfurized mixtures of terpene compounds or mixtures of at least one terpene compound and at least one sulfurized terpene compound. Sulfurized terpene compounds can be prepared by sulfurizing terpene compounds with sulfur, sulfur halides, or mixtures of sulfur or sulfur dioxide with hydrogen sulfide as will be described more fully hereinafter. Also, the sulfurization of various terpene compounds has been described in the prior art. For example, the sulfurization of pine oil is described in U.S. Pat. No. 2,012,446.

The other olefinic compound which may be combined with the terpene compound may be any of several olefinic compounds such as those described earlier. For example, the olefins may be of the type illustrated by Formula IV above.

The other olefin used in combination with the terpene also may be an unsaturated fatty acid, an unsaturated fatty acid ester, mixtures thereof, or mixtures thereof with the olfins described above. The term "fatty acid" as used herein refers to acids which may be obtained by hydrolysis of naturally occuring vegetable or animal fats or oils. These fatty acids usually contain from 16 to 20 carbon atoms and are mixtures of saturated and unsaturated fatty acids. The unsaturated fatty acids generally contained in the naturally occurring vegetable or animal fats and oils may contain one or more double bonds and such acids include palmitoleic acid, oleic acid, linoleic acid, linolenic acid, and erucic acid.

The unsaturated fatty acids may comprise mixtures of acids such as those obtained from naturally occurring animal and vegetable oils such as lard oil, tall oil, peanut oil, soybean oil, cottonseed oil, sunflower seed oil, or wheat germ oil. Tall oil is a mixture of rosin acids, mainly abietic acid, and unsaturated fatty acids, mainly oleic and linoleic acids. Tall oil is a by-product of the sulfate process for the manufacture of wood pulp.

The most particularly preferred unsaturated fatty acid esters are the fatty oils, that is, naturally occurring esters of glycerol with the fatty acids described above, and synthetic esters of similar structure. Examples of naturally occurring fats and oils containing unsaturation include animal fats such as Neat's-foot oil, lard oil, depot fat, beef tallow, etc. Examples of naturally occurring vegetable oils include cottonseed oil, corn oil, poppy-seed oil, safflower oil, sesame oil, soybean oil, sunflower seed oil and wheat germ oil.

The fatty acid esters which are useful also may be prepared from aliphatic olefinic acids of the type described above such as oleic acid, linoleic acid, linolenic acid, and behenic acid by reaction with alcohols and polyols. Examples of aliphatic alcohols which may be reacted with the above-identified acids include monohydric alcohols such as methanol, ethanol, n-propanol, isopropanol, the butanols, etc.; and polyhydric alcohols including ethylene glycol, propylene glycol, trimethylene glycol, neopentyl glycol, glycerol, etc.

The other olefinic compound utilized with the terpene compound in the preparation of the compositions of the invention includes sulfurized derivatives of said olefinic compounds. Thus, the olefin may be any one or more of the above-identified olefinic compound, their sulfurized derivatives, or mixtures of said olefinic compounds and sulfurized derivatives. The sulfurized derivatives can be prepared by methods known in the art utilizing sulfurizing reagents such as sulfur, sulfur halides or mixtures of sulfur or sulfur dioxide with hydrogen sulfide.

The amounts of the terpene compounds and other olefinic compounds contained in the mixture to be sulfurized can vary over a wide range although a sufficient amount of the other olefinic compounds should be contained in the mixture to result in a sulfurized composition having the desired oil-solubility. It has been observed that in some formulations, sulfurized terpenes such as sulfurized pine oil may not exhibit the desired oil solubility characteristics, and it is essential that the mixture to be sulfurized contain enough of the other olefinic compound to result in the formation of a sulfurized composition having the desired oil-solubility. Generally, the equivalent ratio of terpene to other olefin is from about 1:20 to about 10:1, and more generally will range from about 1:10 to about 5:1. More preferably, the equivalent ratio of terpene to other olefin will be from about 1:10 to about 2:1. As mentioned above, the other olefinic compound may be (i) at least one aliphatic, aryl aliphatic or alicyclic olefinic hydrocarbon containing at least 3 carbon atoms, (ii) at least one unsaturated fatty acid or unsaturated fatty acid ester, (iii) at least one sulfurized derivative of (i) or (ii), and (iv)

mixtures thereof. The equivalent ratios of the various olefinic compounds when mixtures are utilized can be varied over a wide range, and the particular equivalent ratios will depend upon the raw materials available as well as the properties desired in the sulfurized composition.

It is frequently advantageous to incorporate materials useful as sulfurization promoters in the reaction mixture. These promoters which may be acidic, basic or neutral have been discussed earlier.

The amount of promoter material used is generally about 0.0005-2.0% of the combined weight of the terpene and olefinic compounds. In the case of the preferred ammonia and amine catalysts, about 0.0005-0.5 mole per mole of the combined weight is preferred, and about 0.001-0.1 mole is especially desirable.

Water is also present in the reaction mixture either as a promoter or as a diluent for one or more of the promoters recited hereinabove. The amount of water, when present, is usually about 1-25% by weight of the olefinic compound. The presence of water is, however, not essential and when certain types of reaction equipment are used it may be advantageous to conduct the reaction under substantially anhydrous conditions.

When promoters are incorporated into the reaction mixture as described hereinabove, it is generally observed that the reaction can be conducted at lower temperatures, and the product generally is lighter in color.

The sulfurizing reagent used in this invention may be, for example, sulfur, a sulfur halide such as sulfur monochloride or sulfur dichloride, a mixture of hydrogen sulfide and sulfur or sulfur dioxide, or the like. Sulfur, or mixtures of sulfur and hydrogen sulfide often are preferred. However, it will be understood that other sulfurization reagents may, when appropriate, be substituted therefor. Commercial sources of all the sulfurizing reagents are normally used for the purpose of this invention, and impurities normally associated with these commercial products may be present without adverse results.

When the sulfurization reaction is effected by the use of sulfur alone, the reaction is effected by merely heating the reagents with the sulfur at temperatures of from about 50° to 250° C., usually, from about 150° to about 210° C. The weight ratio of the combination of terpene and other olefin to sulfur is between about 5:1 and about 15:1, generally between about 5:1 and about 10:1. The sulfurization reaction is conducted with efficient agitation and generally in an inert atmosphere (e.g., nitrogen). If any of the components or reagents are appreciably volatile at the reaction temperature, the reaction vessel may be sealed and maintained under pressure. It is frequently advantageous to add the sulfur portionwise to the mixture of the other components.

When mixtures of sulfur and hydrogen sulfide are utilized in the process of the invention, the amounts of sulfur and hydrogen sulfide per mole of terpene and other olefin are, respectively, usually about 0.3 to about 3 gram-atoms and about 0.1 to about 1.5 moles. A preferred range is from about 0.5 to about 2.0 gram-atoms and about 0.4 to about 1.25 moles, respectively, and the most desirable ranges are about 0.8 to about 1.8 gram-atoms, and about 0.4 to about 0.8 mole, respectively. In batch operations, the components are introduced at levels to provide these ranges. In semi-continuous operations, they may be admixed at any ratio, but on a mass balance basis, they are present so as to be consumed in amounts within these ratios. Thus, for example, if the reaction vessel is initially charged with sulfur alone, the olefinic compound and hydrogen sulfide are added incrementally at a rate such that the desired ratio is obtained.

When mixtures of sulfur and hydrogen sulfide are utilized in the sulfurization reaction, the temperature range of the sulfurization reaction is generally from about 50° to about 350° C. The preferred range is about 100° to about 200° C. with about 120° to about 180° C. being especially suitable. The reaction often is conducted under super atmospheric pressure which may be and usually is autogenous pressure (i.e., pressure which naturally developed during the course of the reaction), but may also be externally applied pressure. The exact pressure developed during the reaction is dependent upon such factors as design and operation of the system, the reaction temperature, and the vapor pressure of the reactants and products, and it may vary during the course of the reaction.

While it is preferred generally that the reaction mixture consists entirely of the components and reagents described above, the reaction also may be effected in the presence of an inert solvent (e.g., an alcohol, ether, ester, aliphatic hydrocarbon, halogenated aromatic hydrocarbon, etc.) which is liquid within the temperature range employed. When the reaction temperature is relatively high, for example, at about 200° C., there may be some evolution of sulfur from the product which is avoided is a lower reaction temperature such as from about 150°-170° C. is used.

The time required for the sulfurization reaction to be completed will vary depending the upon the reagents, the ratios thereof, the reaction temperature, the presence or absence of promoters, and the purity of the reagents. When a mixture of sulfur and sulfur dioxide is used as the sulfurizing agent and the reaction is conducted at an elevated pressure in a closed vessel, the course of the reaction can conveniently be followed by monitoring the pressure in the reaction vessel. The reaction generally can be considered complete when the pressure levels off to a constant value. Following the preparation of the sulfurized mixture by the procedures described above, it is generally preferred to remove substantially all low boiling materials, typically by venting the reaction vessel or by distillation at atmospheric pressure, vacuum distillation or stripping, or the passage of an inert gas such as nitrogen through the mixture at a suitable temperature and pressure. Any solids which are present in the reaction mixture may be removed conveniently, in most instances, by merely pouring off the liquid product. If further removal of solids is desired, such conventional techniques as filtration or centrifugation may be used.

In some instances, it may be desirable to treat the sulfurized product obtained in accordance with the procedures described herein to reduce active sulfur.

The following examples illustrate the preparation of sulfurized terpene compounds and sulfurized mixtures of terpenes and olefinic compounds which are useful as component (B) in the present invention.

EXAMPLE XXIII

To a reaction vessel there is charged 372 parts (2 equivalents) of a commercially available pine oil (Sargent Welch), and the pine oil is heated and stirred. Sulfur (128 parts) is added slowly with nitrogen blowing while the reaction temperature is maintained at about 35° C. After addition of the sulfur is completed, nitrogen is bubbled through the reaction mixture while it is heated to reflux at about 145° C. After a total reaction time of about 8 hours, the mixture is filtered through filter aid. The filtrate is the desired sulfurized product containing 23.35% sulfur (theory 25.6).

EXAMPLE XXIV

The procedure of Example XXIII is repeated except that the reaction mixture comprises 186 parts of pine oil (1 equivalent) and 32 parts of sulfur (1.0 equivalent). The product obtained in this matter has a sulfur content of 15.6% (theory 14.68).

EXAMPLE XXV

To a reaction vessel there is added 372 parts (2 equivalents) of pine oil and 96 parts (3 equivalents) of sulfur. When all of the sulfur is added, the mixture is heated to 150° C. with nitrogen blowing, and the mixture is maintained at this temperature for about 10 hours. The reaction mixture is filtered through a filter aid, and the filtrate is the desired product having a sulfur content of 17.25% (theory 20.5).

EXAMPLE XXVI

Pine oil (372 parts, 2 equivalents) is added to a reaction vessel, and the pine oil is heated with stirring. Sulfur (190 parts, 6 equivalents) is added slowly to the stirred pine oil, and after addition is completed, nitrogen is blown through the reaction mixture which is heated to a temperature of about 145° C. Triethanol amine (5.62 parts) is added, and heating of the mixture is continued with reflux until the sulfur appears to be dissolved. The mixture is filtered, and the filtrate is the desired product containing 25.4% sulfur (theory 33.80).

EXAMPLE XXVII

A mixture of 111 parts (0.5 mole) of a distilled $C_{16}$ alpha-olefin and 93 parts (0.5 mole) of pine oil is prepared and heated with stirring in a reaction vessel. Sulfur (64 parts, 2 moles) is added slowly, and the reaction temperature is raised to about 170° C. The reaction mixture is maintained at a temperature of 160° C. with nitrogen blowing. Some refluxing of the light ends of the pine oil is observed. The reaction mixture is then cooled and filtered through a filter aid. The filtrate is the desired product containing 25.16% sulfur (theory 23.9).

EXAMPLES XXVIII-XXXI

The general procedure of Example XXVII is repeated except that the equivalent ratio of olefin:pine oil:sulfur is varied, and in Example 5, a promoter system consisting of 0.043 equivalent of triethanol amine and 0.01 equivalent of 2,5-bis(tertoctyldithio)thiadiazole are used as promoter for each equivalent of pine oil and the mixture. Further details regarding these examples is found in the following Table I.

TABLE I

| Example | Olefin | Equivalent Ratio Olefin/Pine Oil/S | % S in Product Act/Theory |
|---|---|---|---|
| XXVIII | $C_{16}$ olefin | 1:1:3 | 19.07/19.09 |
| XXIX | $C_{16}$ olefin | 1:1:5 | 27.44/28.17 |
| XXX | $C_{16}$ olefin | 1:1:6 | 28.82/32 |
| XXXI | $C_{16}$ olefin | 1:1:5 | 24.57/27.77 |

EXAMPLE XXXII

A mixture of 186 parts (1 equivalent) of pine oil and 168 parts (1 equivalent) of polypropylene is prepared, and 96 parts (3 equivalents) of sulfur are added with stirring. The reaction mixture is heated to a temperature of about 170° C. with nitrogen blowing and maintained at this temperature for 10 hours. The reaction mixture then is cooled and filtered through filter aid. The filtrate is the desired product having a sulfur content of 16.79% (theory 21.33%).

EXAMPLE XXXIII

The mixture of 186 parts of pine oil (1 equivalent), 126 parts of nonene (1 equivalent) and 192 parts (6 equivalents) of sulfur is prepared and heated to reflux at about 135° C. for 2 hours. After cooling overnight, 10.1 parts of triethyl amine (0.1 equivalent) and 4.3 parts of 2,5-bis(tert-octyldithio)thiadiazole are added as promoter. The mixture is heated to 135°-140° C. with nitrogen blowing until the reaction mixture becomes clear. The mixture is heated an additional 6 hours at reflux and filtered through a filter aid. The filtrate is the desired product containing 33.49% sulfur (theory 37.1%).

EXAMPLE XXXIV

Polypropylene (252 parts, 1.5 equivalents) is charged to a reaction vessel equipped with a condenser and stirrer. The polypropylene is stirred and 48 parts (1.5 equivalents) of sulfur are added. This reaction mixture is heated to about 170° C. and maintained at this temperature for about 5 hours and cooled. Pine oil (279 parts, 1.5 equivalents) is added to the reaction mixture which is then heated to a temperature of about 150° C. and maintained at this temperature with nitrogen blowing for about 8 hours. The mixture is cooled and filtered through a filter aid to yield the desired product having a sulfur content of 8.36% (theory 8.2%).

The relative amounts of the metal salts of dithiocarbamic acid (component (A)) and the sulfurized organic compound (component (B)) may vary over a wide range depending upon the intended use of the composition. Generally, the weight ratio of metal salt (A) to sulfurized adduct (B) is within the range of from about 1:10 to about 50:1. The precise amounts of the two components to be included in the compositions of the invention can be readily determined by one skilled in the art.

The compositions of the present invention also contain at least one auxiliary corrosion-inhibiting material (component (C)). In one embodiment, corrosion-inhibiting component (C) is at least one dimercaptothiadiazole or oil-soluble derivative thereof. Such materials provide corrosion-inhibiting properties, and particularly, such compositions are useful in inhibiting copper activity such as copper staining.

The dimercaptothiadiazoles which can be utilized in the present invention starting materials for the preparation of oil-soluble derivatives containing the dimercaptothiadiazole nucleus have the following structural formulae and names.

2,5-Dimercapto-1,3,4-thiadiazole

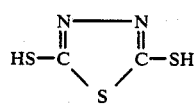

3,5-Dimercapto-1,2,4-thiadiazole

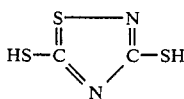

3,4-Dimercapto-1,2,5-thiadiazole

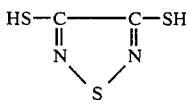

4,5-Dimercapto-1,2,3-thiadiazole

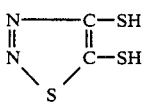

Of these the most readily available, and the one preferred for the purposes of this invention, is 2,5-dimercapto-1,3,4-thiadiazole. This compound will sometimes be referred to hereinafter as DMTD. However, it is to be understood that any of the other dimercaptothiadiazoles may be substituted for all or a portion of the DMTD.

DMTD is conveniently prepared by the reaction of one mole of hydrazine, or a hydrazine salt, with two moles of carbon disulfide in an alkaline medium, followed by acidification.

When the compositions of the present invention are to be utilized in the preparation of lubricating oils, component (C) will be DMTD or derivatives of DMTD. Derivatives of DMTD have been described in the art, and any such compounds can be included in the compositions of the present invention. The preparation of some derivatives of DMTD is described in E. K. Fields "Industrial and Engineering Chemistry", 49, p. 1361-4 (September 1957). For the preparation of the oil-soluble derivatives of DMTD, it is possible to utilize already prepared DMTD or to prepare the DMTD in situ and subsequently adding the material to be reacted with DMTD.

U.S. Pat. Nos. 2,719,125; 2,719,126; and 3,087,937 describe the preparation of various 2,5-bis(hydrocarbon dithio)-1,3,4-thiadiazoles. The hydrocarbon group may be aliphatic or aromatic, including cyclic, alicyclic, aralkyl, aryl and alkaryl. Such compositions are effective corrosion-inhibitors for silver, silver alloys and similar metals. Such polysulfides which can be represented by the following general formula

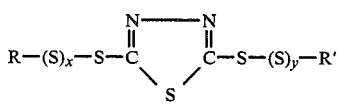 (VII)

wherein R and R' may be the same or different hydrocarbon groups, and x and y be integers from 0 to about 8, and the sum of x and y being at least 1. A process for preparing such derivatives is described in U.S. Pat. No. 2,191,125 as comprising the reaction of DMTD with a suitable sulfenyl chloride or by reacting the dimercapto diathiazole with chlorine and reacting the resulting disulfenyl chloride with a primary or tertiary mercaptan. Suitable sulfenyl chlorides useful in the first procedure can be obtained by chlorinating a mercaptan (RSH or R'SH) with chlorine in carbon tetrachloride. In a second procedure, DMTD is chlorinated to form the desired bissulfenyl chloride which is then reacted with at least one mercaptan (RSH and/or R'SH). The disclosures of U.S. Pat. Nos. 2,719,125; 2,719,126; and 3,087,937 are hereby incorporated by reference for their description of derivatives of DMTD useful in the compositions of the invention.

U.S. Pat. No. 3,087,932 describes a one-step process for preparing 2,5-bis(hydrocarbyldithio)-1,3,4-thiadiazole. The procedure involves the reaction of either DMTD or its alkali metal or ammonium salt and a mercaptan in the presence of hydrogen peroxide and a solvent. Oil-soluble or oil-dispersible reaction products of DMTD can be prepared also by the reaction of the DMTD with a mercaptan and formic acid. Compositions prepared in this manner are described in U.S. Pat. No. 2,749,311. Any mercaptan can be employed in the reaction although aliphatic and aromatic mono- or poly-mercaptan containing from 1 to 30 carbon atoms are preferred. The disclosures of U.S. Pat. Nos. 3,087,932 and 2,749,311 are hereby incorporated by reference for their description of DMTD derivatives which can be utilized as component (C) of the composition of this invention.

Carboxylic esters of DMTD having the general formula

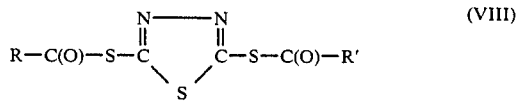 (VIII)

wherein R and R' are hydrocarbon groups such as aliphatic, aryl and alkaryl groups containing from about 2 to about 30 or more carbon atoms are described in U.S. Pat. No. 2,760,933. These esters are prepared by reacting DMTD with an organic acid halide (chloride) and a molar ratio of 1:2 at a temperature of from about 25° to about 130° C. Suitable solvents such as benzene or dioxane can be utilized to facilitate the reaction. The reaction product is washed with dilute aqueous alkali to remove hydrogen chloride and any unreacted carboxylic acid. The disclosure of U.S. Pat. No. 2,760,933 is hereby incorporated by reference for its description of various TMTD derivatives which can be utilized in the compositions of the present invention.

Condensation products of alpha-halogenated aliphatic monocarboxylic acids having at least 10 carbon atoms with DMTD are described in U.S. Pat. No. 2,836,564. These condensation products generally are characterized by the following formula

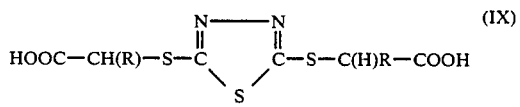 (IX)

wherein R is an alkyl group of at least 10 carbon atoms. Examples of alpha-halogenated aliphatic fatty acids which can be used include alpha-bromo-lauric acid, alpha-chloro-lauric acid, alpha-chloro-stearic acid, etc. The disclosure of U.S. Pat. No. 2,836,564 is hereby incorporated by reference for its disclosure of derivatives of DMTD which can be utilized in the compositions of the present invention.

Oil-soluble reaction products of unsaturated cyclic hydrocarbons and unsaturated ketones are described in U.S. Pat. Nos. 2,764,547 and 2,799,652, respectively, and a disclosure of these references also are hereby incorporated by reference for their description of materials which are useful as component (C) in the compositions of the present invention. Examples of unsaturated cyclic hydrocarbons described in the '547 patent include styrene, alpha-methyl styrene, pinene, dipentene, cyclopentadiene, etc. The unsaturated ketones described in U.S. Pat. No. 2,799,652 include aliphatic, aromatic or heterocyclic unsaturated ketones containing from about 4 to 40 carbon atoms and from 1 to 6 double bonds. Examples include mesityl oxide, phorone, isophorone, benzal acetophenone, furfural acetone, difurfuryl acetone, etc.

U.S. Pat. No. 2,765,289 describes products obtained by reacting DMTD with an aldehyde and a diaryl amine in molar proportions of from about 1:1:1 to about 1:4:4. The resulting products are suggested as having the general formula

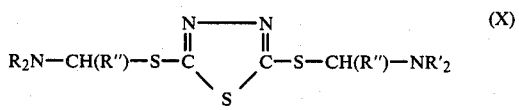
(X)

wherein R and R' are the same or different aromatic groups, and R" is hydrogen, an alkyl group, or an aromatic group. The aldehydes useful in the preparation of such products as represented by Formula X include aliphatic or aromatic aldehydes containing from 1 to 244 carbon atoms, and specific examples of such aldehydes include formaldehyde, acetaldehyde, benzaldehyde, 2-ethylhexyl aldehyde, etc. The disclosure of this patent also is hereby incorporated by reference for its identification of various materials which can be utilized in the compositions of this invention as component (C).

Component (C) in the compositions of the present invention also may be amine salts of DMTD such as those having the following formula

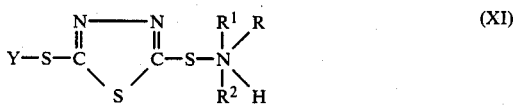
(XI)

in which Y is hydrogen or the amino group

in which R is an aliphatic, aromatic or heterocyclic group, and $R^1$ and $R^2$ are independently aliphatic, aromatic or heterocyclic groups containing from about 6 to about 60 carbon atoms. The amine used in the preparation of the amine salts can be aliphatic or aromatic mono- or polyamines, and the amines may be primary, secondary or tertiary amines. Specific examples of suitable amines include hexylamine, dibutylamine, dodecylamine, ethylenediamine, propylenediamine, tetraethylenepentamine, and mixtures thereof. The disclosure of U.S. Pat. No. 2,910,439 is hereby incoporated by reference for its listing of suitable amine salts.

Dithiocarbamate derivatives of DMTD are described in U.S. Pat. Nos. 2,690,999 and 2,719,827. Such compositions can be represented by the following formulae

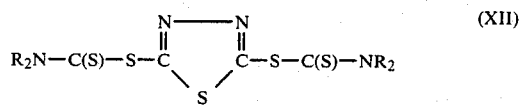
(XII)

and

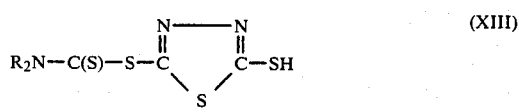
(XIII)

wherein the R groups are straight-chain or branch-chain saturated or unsaturated hydrocarbon groups selected from the group consisting of alkyl, aralkyl and alkaryl groups. The disclosures of these two patents also are hereby incorporated by reference for the identification of various thiadiazyl dithiocarbamates which are useful as component (C) in the compositions of the present invention.

U.S. Pat. No. 2,850,453 describes products which are obtained by reacting DMTD, an aldehyde and an alcohol or an aromatic hydroxy compound in a molar ratio of from 1:2:1 to 1:6:5. The aldehyde employed can be an aliphatic aldehyde containing from 1 to 20 carbon atoms or an aromatic or heterocyclic aldehyde containing from about 5 to about 30 carbon atoms. Examples of suitable aldehydes include formaldehyde, acetaldehyde, benzaldehyde. The reaction can be conducted in the presence or absence of suitable solvents by (a) mixing all of the reactants together and heating, (b) by first reacting an aldehyde with the alcohol or the aromatic hydroxy compound, and then reacting the resultant intermediate with the thiadiazole, or (c) by reacting the aldehyde with thiadiazole first and the resulting intermediate with the hydroxy compound. The disclosure of U.S. Pat. No. 2,850,453 is hereby incorporated by reference for its identification of thiadiazole derivatives useful as component (C) in the compositions of the present invention.

U.S. Pat. No. 2,703,784 describes products obtained by reacting DMTD with an aldehyde and a mercaptan. The aldehydes are similar to those disclosed in U.S. Pat. No. 2,850,453, and the mercaptans may be aliphatic or aromatic mono- or poly-mercaptans containing from about 1 to 30 carbon atoms. Examples of suitable mercaptans include ethyl mercaptan, butyl mercaptan, octyl mercaptan, thiophenol, etc. The disclosure of this patent also is incorporated by reference.

The preparation of 2-hydrocarbyldithio-5-mercapto-1,3,4-thiadiazoles having the formula

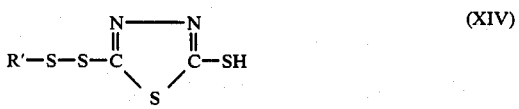
(XIV)

wherein R' is a hydrocarbyl substituent is described in U.S. Pat. No. 3,663,561. The compositions are prepared by the oxidative coupling of equomolecular portions of a hydrocarbyl mercaptan and DMTD or its alkali metal mercaptide. The compositions are reported to be excellent sulfur scavengers and are useful in preventing copper corrosion by active sulfur. The mono-mercaptans used in the preparation of the compounds are represented by the formula

R'SH wherein R' is a hydrocarbyl group containing from 1 to about 280 carbon atoms. A peroxy compound, hypohalide or air, or mixtures thereof can be utilized to promote the oxidative coupling. Specific examples of the mono-mercaptan include methyl mercaptan, isopropyl mercaptan, hexyl mercaptan, decyl mercaptan, and long chain alkyl mercaptans, for example, mercaptans derived from propene polymers and isobutylene polymers especially polyisobutylenes, having 3 to about 70 propene or isobutylene units per molecule. The disclosure of U.S. Pat. No. 3,663,561 is hereby incorporated by reference for its identification of DMTD derivatives which are useful as component (C) in the compositions of this invention.

Another material useful as component (C) in the compositions of the present invention is obtained by reacting a thiadiazole, preferably DMTD with an oil-soluble dispersant, preferably a substantially neutral or acidic carboxylic dispersant in a diluent by heating the mixture above about 100° C. This procedure, and the derivatives produced thereby are described in U.S. Pat. No. 4,136,043, the disclosure of which is hereby incorporated by reference. The oil-soluble dispersants which are utilized in the reaction with the thiadiazoles are often identified as "ashless dispersants". Various types of suitable ashless dispersants useful in the reaction are described in the '043 patent.

Another material useful as component (C) in the compositions of the invention is obtained by reacting a thiadiazole, preferably DMTD, with a peroxide, preferably hydrogen peroxide. The resulting nitrogen- and sulfur-containing composition is then reacted with a polysulfide, mercaptan or amino compound (especially oil-soluble, nitrogen-containing dispersants). This procedure and the derivatives produced thereby are described in U.S. Pat. No. 4,246,126, the disclosure of which is incorporated herein by reference.

U.S. Pat. No. 4,140,643 describes nitrogen and sulfur-containing compositions which are oil-soluble and which are prepared by reacting a carboxylic acid or anhyride containing up to about 10 carbon atoms and having at least one olefinic bond with compositions of the type described in U.S. Pat. No. 4,136,043. The preferred carboxylic acid or anhydride is maleic anhydride. The disclosures of U.S. Pat. Nos. 4,136,043 and 4,140,643 are hereby incorporated by reference for their disclosures of materials useful as component (C) in the compositions of the present invention.

U.S. Pat. No. 4,097,387 describes DMTD derivatives prepared by reacting a sulfur halide with an olefin to form an intermediate which is then reacted with an alkali metal salt of DMTD. More recently, U.S. Pat. No. 4,487,706 describes a DMTD derivated prepared by reacting an olefin, sulfur dichloride and DMTD in a one-step reaction. The olefins generally contain from about 6 to 30 carbon atoms. The disclosures of U.S. Pat. Nos. 4,097,387 and 4,487,706 are hereby incorporated by reference for their descriptions of oil-soluble DMTD derivatives which are useful as component (C) in the compositions of this invention.

The amount of the auxiliary corrosion-inhibitor such as the oil-soluble derivatives of dimercaptothiadiazole (component (C)) included in the compositions of the present invention may vary over a wide range depending upon the intended end use of the composition. Where the compositions of the present invention are to be utilized in the preparation of lubricating oil formulations, the amount of the thiadiazole derivative included in the composition should be an amount sufficient to provide the desired corrosion-inhibiting properties to the final lubricating oil. Generally the weight ratio of the auxiliary corrosion-inhibitor (C) to the mixture of components (A) and (B) is from about 0.001:1 to about 0.5:1.

The compositions of the present invention also may contain other materials which are useful in providing additional desirable properties to the composition. Materials which have desirable properties which may be included in the compositions of the invention include, for example, detergents and dispersants of the ash-producing or ashless-type, extreme pressure agents, anti-wear agents, color stabilizers, anti-foam agents, etc.

In one embodiment of the present invention, the compositions of the present invention will contain, in addition to components (A), (B) and (C), at least one oil-soluble dispersant/detergent (component (D)). The dispersant/detergents may be of the ash-producing or the ashless type.

The ash-producing detergents are exemplified by oil-soluble neutral and basic salts of alkali or alkaline earth metals with sulfonic acids or carboxylic acids. The most commonly used salts of such acids are those of sodium, potassium, lithium, calcium, magnesium, strontium and barium.

The term "basic salt" is used to designate metal salts wherein the metal is present in stoichiometrically larger amounts than the organic acid group. The commonly employed methods for preparing the basic salts involve heating a mineral oil solution of an acid with a stoichiometric excess of a metal neutralizing agent such as the metal oxide, hydroxide, carbonate, bicarbonate, or sulfide at a temperature of about 50° C. and filtering the resulting mass. The use of a "promoter" in the neutralization step to aid the incorporation of a large excess of metal likewise is known. Examples of compounds useful as the promoter include phenolic substances such as phenol, naphthol, alkylphenol, thiophenol, sulfurized alkylphenol, and condensation products of formaldehyde with a phenolic substance; alcohols such as methanol, 2-propanol, octyl alcohol, cellosolve, carbitol, ethylene glycol, stearyl alcohol, and cyclohexyl alcohol; and amines such as aniline, phenylenediamine, phenothiazine, phenyl-beta-naphthylamine, and dodecylamine. A particularly effective method for preparing the basic salts comprises mixing an acid with an excess of a basic alkaline earth metal neutralizing agent and at least one alcohol promoter, and carbonating the mixture at an elevated temperature such as 60°-200° C.

Ashless detergents and dispersants are so called despite the fact that, depending on its constitution, the dispersant may upon combustion yield a non-volatile material such as boric oxide; however, it does not ordinarily contain metal and therefore does not yield a metal-containing ash on combustion. Many types are known in the art, and any of them are suitable for use in the lubricant compositions of this invention. The following are ilustrative:

(1) Reaction products of carboxylic acids (or derivatives thereof) containing at least about 34 and preferably at least about 54 carbon atoms with nitrogen containing compounds such as amine, organic hydroxy compounds such as phenols and alcohols, and/or basic inorganic materials. Examples of these "carboxylic dispersants" are described in British Patent No. 1,306,529 and in many U.S. patents including the following:

U.S. Pat. No. 3,163,603
U.S. Pat. No. 3,215,707
U.S. Pat. No. 3,271,310
U.S. Pat. No. 3,281,357
U.S. Pat. No. 3,311,558
U.S. Pat. No. 3,340,281
U.S. Pat. No. 3,346,493
U.S. Pat. No. 3,351,552
U.S. Pat. No. 3,399,141
U.S. Pat. No. 3,433,744
U.S. Pat. No. 3,448,048
U.S. Pat. No. 3,451,933
U.S. Pat. No. 3,467,668
U.S. Pat. No. 3,522,179
U.S. Pat. No. 3,541,012
U.S. Pat. No. 3,542,680
U.S. Pat. No. 3,574,101
U.S. Pat. No. 3,630,904
U.S. Pat. No. 3,632,511
U.S. Pat. No. 3,725,441
U.S. Pat. No. Re. 26,433

(2) Reaction products of relatively high molecular weight aliphatic or alicyclic halides with amines, preferably olyalkylene polyamines. These may be characterized as "amine dispersants" and examples thereof are described for example, in the following U.S. patents:

U.S. Pat. No. 3,275,554
U.S. Pat. No. 3,438,757
U.S. Pat. No. 3,454,555
U.S. Pat. No. 3,565,804

(3) Reaction products of alkyl phenols in which the alkyl group contains at least about 30 carbon atoms with aldehydes (especially formaldehyde) and amines (especially polyalkylene polyamines), which may be characterized as "Mannich dispersants". The materials described in the following U.S. patents are illustrative:

U.S. Pat. No. 2,459,112
U.S. Pat. No. 2,984,550
U.S. Pat. No. 3,166,516
U.S. Pat. No. 3,355,270
U.S. Pat. No. 3,413,347
U.S. Pat. No. 3,442,808
U.S. Pat. No. 3,454,497
U.S. Pat. No. 3,461,172
U.S. Pat. No. 3,539,633
U.S. Pat. No. 3,586,629
U.S. Pat. No. 3,591,598
U.S. Pat. No. 3,634,515
U.S. Pat. No. 3,697,574
U.S. Pat. No. 3,725,480
U.S. Pat. No. 3,980,569

(4) Products obtained by post-treating the carboxylic, amine or Mannich dispersants with such reagents as urea, thiourea, carbon disulfide, aldehydes, ketones, carboxylic acids, hydrocarbon-substituted succinic anhydrides, nitriles, epoxides, boron compounds, or the like. Exemplary materials of this type are described in the following U.S. patents:

U.S. Pat. No. 3,036,003
U.S. Pat. No. 3,200,107
U.S. Pat. No. 3,254,025
U.S. Pat. No. 3,278,550
U.S. Pat. No. 3,281,428
U.S. Pat. No. 3,282,955
U.S. Pat. No. 3,366,569
U.S. Pat. No. 3,373,111
U.S. Pat. No. 3,442,808
U.S. Pat. No. 3,455,832
U.S. Pat. No. 3,493,520
U.S. Pat. No. 3,513,093
U.S. Pat. No. 3,539,633
U.S. Pat. No. 3,579,450
U.S. Pat. No. 3,600,372
U.S. Pat. No. 3,639,242
U.S. Pat. No. 3,649,659
U.S. Pat. No. 3,697,574
U.S. Pat. No. 3,703,536
U.S. Pat. No. 3,708,422

(5) Interpolymers of oil-solubilizing monomers such as decyl methacrylate, vinyl decyl ether and high molecular weight olefins with monomers containing polar substituents, e.g., aminoalkyl acrylates or acrylamides and poly-(oxyethylene)substituted acrylates. These may be characterized as "polymeric dispersants" and examples thereof are disclosed in the following U.S. patents:

U.S. Pat. No. 3,329,658
U.S. Pat. No. 3,449,250
U.S. Pat. No. 3,519,565
U.S. Pat. No. 3,666,730
U.S. Pat. No. 3,687,849
U.S. Pat. No. 3,702,300

The above-noted patents are incorporated by reference herein for their disclosures of ashless dispersants.

When the detergent/dispersant (component (D)) is included in the composition of the invention, the weight ratio of component (D) to the combined weight of (A) and (B) will be in the range of from about 1:0.5 to about 1:5.

The compositions of the present invention comprising components (A), (B) and (C) and/or (D) are useful in lubricating oil compositions. The compositions of the invention can be added directly to the lubricant. Preferably, however, they are diluted with a substantially inert, normally liquid organic diluent such as mineral oil, naphtha, benzene, toluene or xylene, to form an additive concentrate. These concentrates usually contain from about 20% to about 90% by weight of the compositions of this invention and may contain, in addition, one or more other additives known in the art and described below. The remainder of the concentrate is the substantially inert normally liquid diluent.

The compositions of the invention are useful particularly for improving the properties of lubricants containing little or no phosphorus, especially lubricants containing less than 0.1% and more generally less than about 0.08% phosphorus. In some instances, the lubricating compositions may contain no phosphorus. Generally, the phosphorus which is present within the lubricating oil compositions of the present invention is in the form of a phosphorodithioate, and more particularly, as Group II metal phosphorodithioates, organic phosphites such as trialkyl phosphites, etc. Lubricating oil compositions containing less than about 0.1% by weight of phosphorus, and more preferably less than about 0.08% by weight of phosphorus generally are known in the art as "low phosphorus lubricating oils". In such low phosphorus or no phosphorus lubricants, it is preferred to use a sulfurized Diels-Alder adduct (component (B)) prepared by reacting sulfur with an adduct in a mole ratio of less than 1:1.

The lubricating oil compositions of the present invention comprise a major amount of oil of lubricating viscosity, including natural and synthetic lubricating oils and mixtures thereof.

Natural oils include animal oils and vegetable oils (e.g., castor oil, lard oil) as well as mineral lubricating oils such as liquid petroleum oils and solvent-treated or acid-treated mineral lubricating oils of the paraffinic, naphthenic or mixed paraffinic-naphthenic types. Oils of lubricating viscosity derived from coal or shale are also useful. Synthetic lubricating oils include hydrocarbon oils an halosubstituted hydrocarbon oils such as polymerized and interpolymerized olefins (e.g., polybutylenes, polypropylenes, propyleneisobutylene copolymers, chlorinated polybutylenes, etc.); poly(1-hexenes), poly(1-octenes), poly(1-decenes), etc. and mixtures thereof; alkylbenzenes (e.g., dodecylbenzenes, tetradecylbenzenes, dinonylbenzenes, di-(2-ethylhexyl-benzenes, etc.); polyphenyls (e.g., biphenyls, terphenyls, alkylated polyphenyls, etc.); alkylated diphenyl ethers and alkylated diphenyl sulfides and the derivatives, analogs and homologs thereof and the like.

Alkylene oxide polymers and interpolymers and derivatives thereof where the terminal hydroxyl groups have been modified by esterification, etherification, etc., constitute another class of known synthetic lubricating oils that can be used. These are exemplified by the oils prepared through polymerization of ethylene oxide or propylene oxide, the alkyl and aryl ethers of these polyoxyalkylene polymers (e.g., methylpolyisopropylene glycol ether having an average molecular weight of about 1000, diphenyl ether of polyethylene glycol having a molecular weight of about 500–1000, diethyl ether of polypropylene glycol having a molecular weight of about 1000–1500, etc.) or mono- and polycarboxylic esters thereof, for example, the acetic acid esters, mixed $C_{3-8}$ fatty acid esters, or the $C_{13}$Oxo acid diester of tetraethylene glycol.

Another suitable class of synthetic lubricating oils that can be used comprises the esters of dicarboxylic acids (e.g., phthalic acid, succinic acid, alkyl succinic acids, alkenyl succinic acids, maleic acid, azelaic acid, suberic acid, sebacic acid, fumaric acid, adipic acid, linoleic acid dimer, malonic acid, alkyl malonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycol monoether, propylene glycol, etc.) Specific examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid and the like.

Esters useful as synthetic oils also include those made from $C_5$ to $C_{12}$ monocarboxylic acids and polyols and polyol ethers such as neopentyl glycol, trimethylol propane, pentaerythritol, dipentaerythritol, tripentaerythritol, etc.

Silicon-based oils such as the polyalkylpolyaryl-, polyalkoxy-, or polyaryloxy-siloxane oils and silicate oils comprise another useful class of synthetic lubricants (e.g., tetraethyl silicate, tetraisopropyl silicate, tetra-(2-ethylhexyl)silicate, tetra-(4-methyl-hexyl)silicate, tetra-(p-tert-butylphenyl)silicate, hexyl-(4-methyl-2-pentoxy)disiloxane, poly(methyl)siloxanes, poly(methylphenyl)siloxanes, etc.). Other synthetic lubricating oils include liquid esters of phosphorus-containing acids (e.g., tricresyl phosphate, trioctyl phosphate, diethyl ester of decane phosphonic acid, etc.), polymeric tetrahydrofurans and the like.

Unrefined, refined and rerefined oils, either natural or synthetic (as well as mixtures of two or more of any of these) of the type disclosed hereinabove can be used in the compositions of the present invention. Unrefined oils are those obtained directly from a natural or synthetic source without further purification treatment. For example, a shale oil obtained directly from retorting operations, a petroleum oil obtained directly from primary distillation or ester oil obtained directly from an esterification process and used without further treatment would be an unrefined oil. Refined oils are similar to the unrefined oils except they have been further treated in one or more purification steps to improve one or more properties. Many such purification techniques are known to those skilled in the art such as solvent extraction, secondary distillation, acid or base extraction, filtration, percolation, etc. Rerefined oils are obtained by processes similar to those used to obtain refined oils applied to refined oils which have been already used in service. Such rerefined oils are also known as reclaimed or reprocessed oils and often are additionally processed by techniques directed to removal of spent additives and oil breakdown products.

The compositions of the present invention will normally be employed in the lubricating composition of the invention in an amount sufficient to provide the desired improvement in properties such as improved oxidation-corrosion-inhibition, anti-wear and/or extreme pressure properties. More generally, this amount will be from about 0.001% to about 20% by weight of the particular oil in which they are utilized. The optimum amount to be used in a given lubricant obviously would depend on the other contents of the particular lubricating composition, the operating conditions to which it is to be subjected, and the particular additives employed. In lubricating compositions operated under extremely adverse conditions, such as lubricating compositions for marine diesel engines, the compositions may be present in the lubricant in amounts of up to about 30% by weight, or more, of the total weight of the lubricating composition.

In one preferred embodiment, the lubricating oil compositions will comprise an oil of lubricating viscosity and components (A), (B) and (C) as described above. Generally, however, component (D) also will be included in the lubricants. The invention also contemplates the use of other additives in the lubricant compositions of this invention. Such additives include, for example, oxidation-inhibiting agents, pour point depressing agents, extreme pressure agents, anti-wear agents, color stabilizers and anti-foam agents.

Auxiliary extreme pressure agents and corrosion- and oxidation-inhibiting agents which may be included in the lubricants of the invention are exemplified by chlorinated aliphatic hydrocarbons such as chlorinated wax; organic sulfides and polysulfides such as benzyl disulfide, bis(chlorobenzyl)disulfide, dibutyl tetrasulfide, sulfurized methyl ester of oleic acid, sulfurized alkylphenol, sulfurized dipentene, and sulfurized terpene. Group II metal phosphorodithioates include zinc dicyclohexylphosphorodithioate, zinc dioctylphosphorodithioate, barium di(heptylphenyl)phosphorodithioate, cadmium dinonylphosphorodithioate, and the zinc salt of a phosphorodithioic acid produced by the reaction of phosphorus pentasulfide with an equimolar mixture of isopropyl alcohol and n-hexyl alcohol. When it is desired to formulate lubricating oils containing low amounts of phosphorus, such phosphorodithioates should be avoided when possible.

Many of the above-mentioned auxiliary extreme pressure agents and corrosion-oxidation inhibitors also serve as anti-wear agents. Zinc dialkylphosphorodithioates are well known examples.

Pour point depressants are a particularly useful type of additive often included in the lubricating oils described herein. The use of such pour point depressants in oil-based compositions to improve low temperature properties of oil-based compositions is well known in the art. See, for example, page 8 of "Lubricant Additives" by C. V. Smalheer and R. Kennedy Smith (Lezius-Hiles Co. publishers, Cleveland, Ohio, 1967).

Examples of useful pour point depressants are polymethacrylates; polyacrylates; polyacrylamides; condensation products of haloparaffin waxes and aromatic compounds; vinyl carboxylate polymers; and terpolymers of dialkylfumarates, vinyl esters of fatty acids and alkyl vinyl ethers. Pour point depressants useful for the purposes of this invention, techniques for their preparation and their uses are described in U.S. Pat. Nos. 2,387,501; 2,015,748; 2,655,479; 1,815,022; 2,191,498; 2,666,746; 2,721,877; 2,721,878; and 3,250,715 which are hereby incorporated by reference for their relevant disclosures.

Anti-foam agents are used to reduce or prevent the formation of stable foam. Typical anti-foam agents include silicones or organic polymers. Additional anti-foam compositions are described in "Foam Control Agents", by Henry T. Kerner (Noyes Data Corporation, 1976), pages 125-162.

The following are illustrative examples of the compositions of the present invention (including additive concentrates and lubricants). All parts and percentages are by weight of the total composition unless otherwise indicated.

| | Parts by Weight |
|---|---|
| Example 1 | |
| Molybdenum di(2-ethylhexyl) dithiocarbamate | 5 |
| Product of Example XV | 0.5 |
| DMTD derivatives of Formula VII where x = 0 and R and R$^1$ are hexyl groups | 0.2 |
| Example 2 | |
| Magnesium dibutyldithiocarbamate | 5 |
| Product of Example I | 5 |
| DMTD derivative of Formula VII where x = 0 and R$^1$ and R$^2$ are octyl groups | 0.2 |
| Basic magnesium petroleum sulfonate | 7.5 |
| Example 3 | |
| Zinc dibutyldithiocarbamate | 5 |
| Product of Example XV | 0.5 |
| DMTD derivatives of Formula VII where x = 0 and R and R$^1$ are hexyl groups | 0.2 |
| Example 4 | |
| Zinc diamyldithiocarbamate | 10 |
| Product of Example VI | 10 |
| Reaction product of DMTD, formaldehyde and tertiary octyl mercaptan prepared as in Example I of U.S. Pat. No. 2,703,784 | 0.1 |
| Example 5 | |
| Zinc diamyldithiocarbamate | 10 |
| Product of Example VI | 10 |

| | Parts by Weight |
|---|---|
| 2-ethyldithia-5-mercapto-1,3,4-thiadiazole prepared in accordance with the procedure of Example I of U.S. Pat. No. 3,663,561 | 0.1 |
| Example 6 | |
| Mineral oil | 50 |
| Composition of Example I | 50 |
| Example 7 | |
| Mineral oil | 70 |
| Composition of Example 4 | 30 |
| Example 8 | |
| Mineral oil | 94 |
| Composition of Example 5 | 3 |
| Example 9 | |
| Mineral oil | 93.5 |
| Zinc diamyldithiocarbamate | 3.90 |
| Product of Example VI | 2.0 |
| Reaction product of DMTD, formaldehyde and tertiary octyl mercaptan prepared as in Example I of U.S. Pat. No. 2,703,784 | 0.1 |
| Reaction product of alkylene polyamine with polybutenyl (molecular weight of about 1700) succinic anhydride | 1.4 |
| Silicon anti-foam agent | 0.01 |
| Example 10 | |
| Mineral oil | 89.5 |
| Zinc diamyldithiocarbamate | 2.0 |
| Product of Example V | 2.0 |
| Reaction product of ethylene-polyamine with polyisobutenyl (molecular weight of about 1000) succinic anhydride | 4.1 |
| Basic magnesium petroleum sulfonate | 1.5 |
| Reaction product of DMTD, formaldehyde and t-octyl mercaptan prepared as in Example I of U.S. Pat. No. 2,703,784 | 0.2 |
| Alkylated arylamine | 0.7 |
| Silicon anti-foam agent | 0.007 |
| Example 11 | |
| Mineral oil | 90.3 |
| Zinc diamyldithiocarbamate | 2.0 |
| Product of Example V | 2.0 |
| Reaction product of ethylene-polyamine with polyisobutenyl (molecular weight of about 1000) succinic anhydride | 4.1 |
| Basic magnesium petroleum sulfonate | 1.5 |
| 1,3,4-thiadiazolyl-2,5-bis-(diethyl dithiocarbamate) | 0.1 |
| Silicon anti-foam agent | 0.007 |

Lubricating oil compositions containing the compositions of the invention as illustrated above exhibit improved corrosion-inhibiting, anti-oxidant, anti-wear and extreme pressure properties. When the lubricating oil composition of this invention contain substantially no phosphorus and a sulfurized Diels-Alder adduct having a molar ratio of sulfur to adduct of less than 1:1, good nitrile seal compatability is obtained.

We claim:

1. An oil-soluble composition which comprises
(A) at least one metal salt of at least one dithiocarbamic acid of the formula $$R_1(R_2)N\text{—CSSH} \qquad (I)$$

wherein R$_1$ and R$_2$ are each independently hydrocarbyl groups in which the total number of carbon atoms in $R_1$ and $R_2$ is sufficient to render the metal salt oil-soluble and (B) at least one oil-soluble sulfurized organic compound, wherein the weight ratio of (A) to (B) is in the range from about 1:10 to about 50:1; and (C) at least one auxiliary corrosion-inhibitor in the form of an oil soluble derivative of a dimercaptothiadiazole wherein the weight ratio of (C) to the mixture of (A) and (B) is from about 0.001:1 to about 0.5:1.

2. The composition of claim 1 wherein $R_1$ and $R_2$ of the dithiocarbamate are each independently alkyl, cycloalkyl, aryl, alkaryl or aralkyl groups.

3. The composition of claim 2 wherein $R_1$ and $R_2$ are alkyl groups containing at least 2 carbon atoms.

4. The composition of claim 1 wherein the metal of the metal salt (A) is a polyvalent metal.

5. The composition of claim 1 wherein the sulfurized organic compound is an aromatic, alkyl or alkenyl sulfide or polysulfide, a sulfurized olefin, a sulfurized carboxylic acid ester, a sulfurized ester olefin, a sulfurized oil, or mixtures thereof.

6. The composition of claim 5 wherein the sulfurized organic compound is a sulfurized olefin.

7. The composition of claim 6 wherein the sulfurized olefin is a sulfurized Diels-Alder adduct of at least one dienophile with at least one aliphatic conjugated diene.

8. The composition of claim 7 wherein the dienophile comprises an alpha, beta-ethylenically unsaturated aliphatic carboxylic acid ester, carboxylic acid amide, halide, nitrile, aldehyde, ketone, or mixtures thereof.

9. The composition of claim 7 wherein the aliphatic conjugated diene corresponds to the formula

wherein R through $R^5$ are each independently selected from the group consisting of hydrogen, alkyl, halo, alkoxy, alkenyl, alkenyloxy, carboxy, cyano, amino, alkylamino, dialkylamino, phenyl, and phenyl substituted with one to three substituents corresponding to R through $R^5$, or R, $R^2$, $R^3$ and $R^5$ are as described and $R^1$ and $R^4$ are alkylene groups joined together to form a cyclic diene.

10. The composition of claim 9 wherein $R^2$ and $R^3$ are hydrogen, and R, $R^1$, $R^4$ and $R^5$ are each independently hydrogen, halo, or lower alkyl.

11. The composition of claim 8 wherein the dienophile is further characterized in that it contains at least one, but not more than two —$C(O)OR_0$ groups wherein $R_0$ is residue of a saturated aliphatic alcohol of up to about 40 carbon atoms.

12. The composition according to claim 9 wherein the diene is piperylene, isoprene, methylisoprene, chloroprene, 1,3-butadiene, or mixtures thereof.

13. The composition according to claim 12 wherein the diene is 1,3-butadiene.

14. The composition according to claim 12 wherein said dienophile is an ester of acrylic acid or methacrylic acid.

15. The composition of claim 7 wherein the sulfurized Diels-Alder adduct (B) comprises the reaction product of sulfur and the Diels-Alder adduct in a molar ratio of from about 0.5 to 1 to about 10:1.

16. The composition of claim 15 wherein the molar ratio of sulfur to Diels-Alder adduct is less than about 4:1.

17. The composition of claim 15 wherein the molar ratio of sulfur to Diels-Alder adduct is less than about 1:1.

18. The composition of claim 1 also containing (D) at least one oil-soluble dispersant/detergent wherein the weight ratio of (D) to the combined weight of (A) and (B) is in the range of from about 1:0.5 to about 1:5.

19. The composition of claim 18 containing a mixture of at least one ash-producing detergent and at least one ashless detergent.

20. A composition useful in preparing lubricating oil compositions which comprises (A) at least one oil-soluble metal salt of at least one dithiocarbamic acid of the formula

$$R_1(R_2)N\text{—CSSH} \qquad (I)$$

wherein the metal is a divalent metal, and $R_1$ and $R_2$ are each independently alkyl groups wherein the total number of carbon atoms in $R_1$ and $R_2$ is sufficient to render the salt oil-soluble, (B) at least one oil-soluble sulfurized olefin wherein the weight ratio of (A) to (B) is in the range from about 1:10 to about 50:1; and (C) at least one auxiliary corrosion-inhibitor in the form of an oil soluble derivative of a dimercaptothiadiazole wherein the weight ratio of (C) to the mixture of (A) and (B) is from about 0.001:1 to about 0.5:1.

21. The composition of claim 20 wherein the sulfurized olefin comprises the reaction product of sulfur with at least one Diels-Alder adduct, the molar ratio of sulfur to adduct being less than about 4:1 wherein the adduct consists essentially of the 1:1 adduct of at least one dienophile selected from the group consisting of alpha, beta-ethylenically unsaturated aliphatic carboxylic acid esters, carboxylic acid amides, ketones, aldehydes, nitriles and halides with at least one aliphatic conjugated diene corresponding to the formula

wherein R through $R^5$ are each independently selected from the group consisting of hydrogen, alkyl, halo, alkoxy, alkenyl, alkenyloxy, carboxy, cyano, amino, alkylamino, dialkylamino, phenyl, and phenyl substituted with one to three substituents corresponding to R through $R^5$, or R, $R^2$, $R^3$ and $R^5$ are as defined and $R^1$ and $R^4$ are alkylene groups joined together to form a cyclic compound.

22. The composition of claim 21 wherein $R_1$ and $R_2$ contain at least about 2 carbon atoms.

23. The composition of claim 21 wherein $R^2$ and $R^3$ are each hydrogen and R, $R^1$, $R^4$ and $R^5$ are each independently hydrogen, chloro or lower alkyl.

24. The composition of claim 21 wherein the dienophile is further characterized that it contains at least one but not more than two

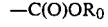

—$C(O)OR_0$ wherein R₀ is the residue of unsaturated aliphatic alcohol of up to about 40 carbon atoms.

25. The composition of claim 23 wherein the diene is piperylene, isoprene, methylisoprene, chloroprene, 1,3-butadiene, or mixtures thereof.

26. The composition of claim 24 wherein the dieneophile is an ester of acrylic acid or methacrylic acid.

27. The composition of claim 21 wherein the metal is zinc.

28. The composition of claim 20 wherein the sulfurized olefin (B) comprises a polysulfurized olefin obtained by reacting a sulfur monohalide with an olefin and subsequently with an alkali metal monosulfide and free sulfur.

29. The composition of claim 20 wherein the sulfurized olefin (B) is prepared by the reaction of an olefin with hydrogen sulfide and sulfur.

30. The composition of claim 20 also containing (D) at least one detergent/dispersant wherein the weight ratio of (D) to the combined weight of (A) and (B) is in the range of from about 1:0.5 to about 1:5.

31. The composition of claim 30 containing at least one ash-producing magnesium-containing detergent.

32. An additive concentrate comprising a substantially inert, normally liquid diluent and from about 20 to about 90% by weight of the composition of claim 1.

33. An additive concentrate comprising a substantially inert, normally liquid diluent and from about 20 to about 90% by weight of the composition of claim 18.

34. An additive concentrate comprising a substantially inert, normally liquid diluent and from about 20 to about 90% by weight of the composition of claim 20.

35. An additive concentrate comprising a substantially inert, normally liquid diluent and from about 20 to about 90% by weight of the composition of claim 30.

36. A lubricating oil composition comprising: a major amount of an oil of lubricating viscosity and, a minor, property improving amount, of an oil-soluble composition comprising:
(A) a metal salt of a dithiocarbamic acid of the formula $$R_1(R_2)N\text{---}CSSH \qquad (I)$$

wherein $R_1$ and $R_2$ are each independently hydrocarbyl groups containing a total number of carbon atoms so as to render the metal salt oil-soluble; and
(B) an oil-soluble sulfurized organic compound, wherein the weight ratio of (A) to (B) is in the range of from about 1:10 to about 50:1; and
(C) an auxiliary corrosion inhibitor in the form of an oil-soluble derivative of a dimercaptothiadiazole wherein the weight ratio of (C) to the mixture of (A) and (B) is from about 0.001:1 to about 0.5:1 wherein the lubricating oil composition contains less than about 0.1% by weight of phosphorus.

37. The lubricating oil composition as claimed in claim 36, further comprising:
(D) an oil-soluble dispersant/detergent wherein the weight ratio of (D) to the combined weight of (A) and (B) is in the range of from about 1:0.5 to about 1:5.

38. The lubricating oil composition as claimed in claim 36, wherein the phosphorus present is present in the form of a phosphorodithioate.

39. The lubricating oil composition as claimed in claim 37, wherein the lubricating oil composition contains substantially no phosphorus.

40. The lubricating oil composition as claimed in claim 39, wherein (B) is the reaction product of sulfur and a Diels-Alder adduct in a molar ratio of from about 0.5:1 to about 10:1.

* * * * *